United States Patent
Miao et al.

(10) Patent No.: US 10,652,895 B2
(45) Date of Patent: May 12, 2020

(54) FEEDBACK INFORMATION SENDING APPARATUS AND METHOD, AND FEEDBACK INFORMATION RECEIVING APPARATUS AND METHOD

(71) Applicant: HUAWEI TECHNOLOGIES CO., LTD., Shenzhen (CN)

(72) Inventors: Jinhua Miao, Shenzhen (CN); Jian Zhang, Beijing (CN); Qinghai Zeng, Shanghai (CN); Wei Quan, Beijing (CN); Bingzhao Li, Beijing (CN); Xun Tang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 15/879,251

(22) Filed: Jan. 24, 2018

(65) Prior Publication Data
US 2018/0152938 A1  May 31, 2018

Related U.S. Application Data

(63) Continuation of application No. PCT/CN2015/085475, filed on Jul. 29, 2015.

(51) Int. Cl.
*H04W 72/04* (2009.01)
*H04L 1/18* (2006.01)
(Continued)

(52) U.S. Cl.
CPC ......... *H04W 72/048* (2013.01); *H04L 1/1628* (2013.01); *H04L 1/1671* (2013.01);
(Continued)

(58) Field of Classification Search
CPC ............... H04W 72/048; H04W 72/04; H04W 72/0446; H04W 16/10; H04W 74/08;
(Continued)

(56) References Cited

U.S. PATENT DOCUMENTS

2008/0069031 A1 * 3/2008 Zhang ................. H04B 7/0617
  370/328
2009/0067335 A1 * 3/2009 Pelletier ............. H04L 41/5025
  370/238
(Continued)

FOREIGN PATENT DOCUMENTS

CN    101588635 A   11/2009
CN    101772039 A    7/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.6.0, 3rd Generation Partnership Project, Valbonne, France (Jun. 2015).
(Continued)

*Primary Examiner* — Chi Ho A Lee
*Assistant Examiner* — Andrew Lee
(74) *Attorney, Agent, or Firm* — Leydig, Voit & Mayer, Ltd.

(57) ABSTRACT

A method includes: allocating, by an eNB, a same uplink shared resource to m UEs, where m≥2; sending, by the UE to the eNB by using the uplink shared resource, uplink data that includes an identifier of the UE and/or buffer status information corresponding to the UE; generating according to successfully received uplink data, feedback information that includes the UE identifier and/or an uplink scheduling grant; and sending, by the eNB, the feedback information by using a MAC PDU, or sending acknowledgement information by using a downlink resource indicated by a combination of an agreed feedback location and an offset. A problem that an eNB cannot correctly send feedback information to each UE when the multiple UEs send uplink data by using a same uplink shared resource and DM-RS is resolved, so
(Continued)

that each UE is clear about whether the uplink data of the UE is successfully sent.

16 Claims, 21 Drawing Sheets

(51) Int. Cl.
*H04W 16/14* (2009.01)
*H04L 5/00* (2006.01)
*H04L 1/16* (2006.01)
*H04L 1/00* (2006.01)

(52) U.S. Cl.
CPC ............... *H04L 1/18* (2013.01); *H04L 5/005* (2013.01); *H04L 5/0037* (2013.01); *H04L 5/0053* (2013.01); *H04W 16/14* (2013.01); *H04W 72/042* (2013.01); *H04W 72/0446* (2013.01); *H04L 2001/0093* (2013.01)

(58) Field of Classification Search
CPC ...... H04W 36/22; H04L 5/005; H04L 5/0037; H04L 5/0053
See application file for complete search history.

(56) References Cited

U.S. PATENT DOCUMENTS

| | | |
|---|---|---|
| 2012/0049926 A1 | 3/2012 | Shimizu et al. |
| 2012/0082022 A1 | 4/2012 | Damnjanovic et al. |
| 2012/0269156 A1 | 10/2012 | Quan et al. |
| 2013/0003678 A1 | 1/2013 | Quan et al. |
| 2013/0102320 A1 | 4/2013 | Suzuki et al. |
| 2015/0029929 A1* | 1/2015 | Suzuki .................. H04L 5/0055 370/312 |
| 2015/0289292 A1* | 10/2015 | Sun .................. H04W 74/0833 370/329 |
| 2015/0334705 A1* | 11/2015 | Zhao .................... H04W 36/22 370/329 |
| 2016/0013891 A1 | 1/2016 | Ji et al. |
| 2016/0043854 A1* | 2/2016 | Damnjanovic ....... H04L 5/0048 370/329 |
| 2016/0149687 A1* | 5/2016 | Lei ........................ H04W 16/10 370/280 |
| 2017/0303116 A1* | 10/2017 | Liu ........................ H04W 8/26 |
| 2017/0353273 A1* | 12/2017 | Zhang ..................... H04W 4/06 |
| 2018/0184461 A1* | 6/2018 | Zhang ................... H04W 74/08 |
| 2018/0279348 A1* | 9/2018 | Huang ............. H04W 72/1289 |

FOREIGN PATENT DOCUMENTS

| | | |
|---|---|---|
| CN | 102118236 A | 7/2011 |
| EP | 2512198 A1 | 10/2012 |
| EP | 2665320 A1 | 11/2013 |
| JP | 2011142532 A | 7/2011 |
| RU | 2534033 C2 | 11/2014 |
| WO | 2010057540 A1 | 5/2010 |
| WO | 2010087199 A1 | 8/2010 |
| WO | 2011120443 A1 | 10/2011 |
| WO | 2012087199 A1 | 6/2012 |
| WO | 2014153769 A1 | 10/2014 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.6.0, 3rd Generation Partnership Project, Valbonne, France (Jun. 2015).

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.6.0, 3rd Generation Partnership Project, Valbonne, France (Jun. 2015).

"Details of latency reduction alternatives," 3GPP TSG-RAN WG2 #69, San Fransisco, USA, R2-101332, 3rd Generation Partnership Project, Valbonne, France (Feb. 2010).

"Discussion on the Retransmission of Contention-Based Transmission," 3GPP TSG RAN WG2 #68bis, Valencia, Spain, R2-100174, 3rd Generation Partnership Project, Valbonne, France (Jan. 2010).

CN/201580044976.1, Office Action, dated Mar. 14, 2019.

JP/2018-504227, Notice of Reasons for Rejection, dated Feb. 8, 2019

* cited by examiner

FEEDBACK INFORMATION SENDING APPARATUS AND METHOD, AND FEEDBACK INFORMATION RECEIVING APPARATUS AND METHOD

CROSS-REFERENCE TO RELATED APPLICATIONS

This application is a continuation of International Application No. PCT/CN2015/085475, filed on Jul. 29, 2015, which is hereby incorporated by reference in its entirety.

TECHNICAL FIELD

The present disclosure relates to the communications field, and in particular, to a feedback information sending apparatus and method.

BACKGROUND

After user equipment (UE) sends uplink data to an evolved NodeB (eNB), the eNB usually needs to send feedback information to the UE.

In Long Term Evolution (LTE), if UE sends uplink data to an eNB by using an uplink shared resource A on a physical uplink shared channel (PUSCH), where the uplink shared resource A further includes a demodulation reference signal (DM-RS) corresponding to the UE, the eNB receives and decodes the uplink data according to the DM-RS corresponding to the UE. After correctly receiving and decoding the uplink data, the eNB sends acknowledgement information (ACK) to the UE or sends negative acknowledgement information (NACK) to the UE by using an agreed downlink resource B on a physical HARQ indicator channel (PHICH). It can be learnt from an LTE communications protocol that a resource location of the agreed downlink resource is obtained by means of calculation according to a resource location of the uplink shared resource A and the DM-RS.

During a process of implementing the present disclosure, the prior art has the following disadvantages: When multiple UEs use a contention based uplink data transmission mode, an eNB may allocate a same uplink shared resource and DM-RS to the multiple UEs. When the multiple UEs send uplink data to the eNB by using the same uplink shared resource, a conflict occurs because the different UEs use the same uplink shared resource and the same DM-RS. Consequently, the eNB cannot correctly send feedback information to the different UEs according to an agreed downlink resource.

SUMMARY

To resolve the prior-art problem, embodiments of the present disclosure provide a feedback information sending apparatus and method, and a feedback information receiving apparatus and method.

In a first aspect of the disclosure, a base station, includes a processor, a memory, and a transceiver. The memory is configured to store at least one instruction, when executed by the processor, causing the processor to: allocate a same uplink shared resource to m user UEs, wherein m is an integer greater than 1; control the transceiver to receive uplink data on the uplink shared resource, wherein the uplink data comprises at least one UE identifier identifying at least one of the m UEs, wherein each UE identifier uniquely represents one UE; determine n UEs, wherein uplink data of the n UEs is successfully received, wherein n is a positive integer and m is greater than or equal to n; generate feedback information, wherein the feedback information comprises n identifiers, and different identifiers represent different UEs; and control the transceiver to send the feedback information by using a Media Access Control protocol data unit (MAC PDU).

In a second aspect, a UE includes: a processor, a memory, and a transceiver. The memory is configured to store at least one instruction, when executed by the processor, causing the processor to: determine an uplink shared resource of the user equipment device; control the transceiver to send uplink data by using the uplink shared resource, wherein the uplink data comprises an identifier of the device; and control the transceiver to receive feedback information by using a MAC PDU, wherein the feedback information comprises n identifiers, different identifiers in the n identifiers represent different devices, the identifiers indicate that uplink data of the n devices is successfully received by a base station, and n is a positive integer.

In a third aspect, a method is provided for sending feedback information. The method may include: allocating a same uplink shared resource to m user equipments (UEs), wherein m is a positive integer greater than 1; receiving uplink data on the uplink shared resource, wherein the uplink data comprises an UE identifier, identifiers of different UEs represent the different UEs, and the UE represented by the identifier of the UE is at least one of the m UEs; determining n UEs, wherein uplink data of the n UEs is successfully received, wherein n is a positive integer and m is greater than or equal to n; generating feedback information, wherein the feedback information comprises n identifiers, and different identifiers represent different UEs; and sending the feedback information by using a MAC PDU.

It is to be understood that both the foregoing general description and the following detailed description are exemplary and explanatory only and are not restrictive of the disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
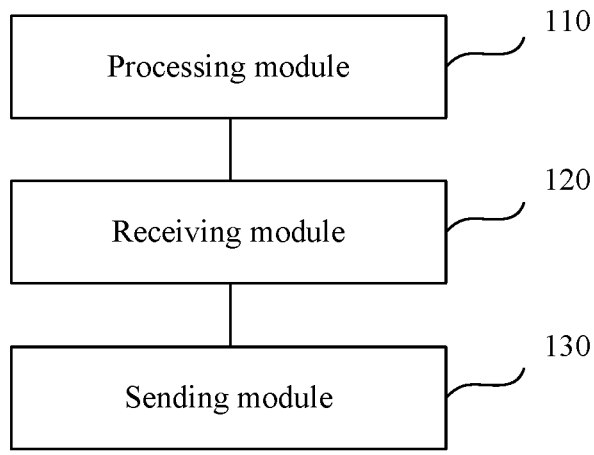
FIG. 1 is a block diagram of a feedback information sending apparatus according to an aspect of the present disclosure.

Referring to FIG. 1, FIG. 1 shows a block diagram of a feedback information sending apparatus according to an aspect of the present disclosure. The feedback information sending apparatus may be implemented as all or a part of an eNB by using software, hardware, or a combination of software and hardware. The feedback information sending apparatus may include a processing module 110, a receiving module 120, and a sending module 130.

The processing module 110 is configured to allocate a same uplink shared resource to m UEs, where m≥2.

The receiving module 120 is configured to receive uplink data on the uplink shared resource. The uplink data includes an UE identifier, identifiers of different UEs represent the different UEs, and the UE represented by the identifier of the UE is at least one of the m UEs.

The processing module 110 is further configured to determine n UEs. Uplink data of the n UEs is successfully received, and m≥n≥1.

The eNB determines, according to the successfully received uplink data that includes identifiers of the UEs, the UE that sends the uplink data.

The processing module 110 is further configured to generate feedback information. The feedback information includes n identifiers, and different identifiers represent different UEs.

The sending module 130 is configured to send the feedback information by using a medium layer user packet data unit (MAC PDU).

In conclusion, according to the feedback information sending apparatus provided in this embodiment, the eNB allocates the same uplink shared resource to the m UEs, where m≥2; the eNB receives the uplink data on the uplink shared resource, where the uplink data includes the identifier of the UE, identifiers of different UEs represent the different UEs, and the UE represented by the identifier of the UE is at least one of the m UEs; the eNB generates the feedback information according to the successfully received uplink data of the n UEs, where the feedback information includes the n identifiers, and m≥n≥1; and the eNB sends the feedback information by using the MAC PDU. This resolves a prior-art problem that an eNB cannot correctly send feedback information to different UEs according to an agreed downlink resource when the multiple UEs send uplink data by using a same uplink shared resource and DM-RS, so that each UE is clear about whether the uplink data of the UE is successfully sent.

In an optional embodiment provided based on the embodiment shown in FIG. 1, the uplink data further includes buffer status information of the UEs, and the buffer status information of the UEs is used to indicate information about remaining to-be-sent data of the UEs.

The processing module 110 is further configured to obtain the identifiers of the UEs and the buffer status information of the UEs by means of decoding.

The processing module 110 is further configured to generate uplink scheduling grants of the UEs. The uplink scheduling grants of the UEs are generated according to the buffer status information of the UEs.

The processing module 110 is further configured to generate the feedback information. The feedback information includes the n identifiers and the uplink scheduling grants corresponding to the UEs.

In an optional embodiment provided based on the embodiment shown in FIG. 1, x pieces of the uplink data include buffer status information of the UE, n≥x≥1, and the buffer status information of the UE is used to indicate information about remaining to-be-sent data.

The processing module 110 is further configured to obtain, by means of decoding, the identifiers of the n UEs and buffer status information corresponding to x UEs.

The processing module 110 is further configured to generate uplink scheduling grants respectively corresponding to the x UEs. The x uplink scheduling grants are generated according to the buffer status information of the x UEs.

The processing module 110 is further configured to generate the feedback information. The feedback information includes the n identifiers and the uplink scheduling grants corresponding to the x UEs.

In an optional embodiment provided based on the embodiment shown in FIG. 1, y pieces of the uplink data include buffer status information of the UE, n≥y≥1, and the buffer status information of the UE is used to indicate information about remaining to-be-sent data.

The processing module 110 is further configured to obtain, by means of decoding, the identifiers of the n UEs and buffer status information corresponding to y UEs.

The processing module 110 is further configured to generate uplink scheduling grants respectively corresponding to x UEs, where y>x≥1. The x uplink scheduling grants indicate current available uplink resources, and the x uplink scheduling grants are generated according to buffer status information of the x UEs.

The processing module 110 is further configured to generate the feedback information. The feedback information includes the n identifiers and the uplink scheduling grants corresponding to the x UEs.

In an optional embodiment provided based on the embodiment shown in FIG. 1, the processing module 110 is configured to generate the feedback information. The feedback information includes a quantity of significant bits, a bit mapping sequence, the n identifiers, and the x uplink scheduling grants.

The quantity of significant bits is used to indicate a quantity of significant bits in the bit mapping sequence. The bit mapping sequence is a bit sequence with a fixed bit quantity.

When the $i^{th}$ bit in the bit mapping sequence is a first value and is significant, it indicates that the $i^{th}$ identifier in the feedback information is followed by the corresponding uplink scheduling grant with a fixed bit quantity.

When the $i^{th}$ bit in the bit mapping sequence is a second value and is significant, it indicates that the $i^{th}$ identifier in the feedback information is not followed by the corresponding uplink scheduling grant with a fixed bit quantity.

The first value is 0 and the second value is 1, or the first value is 1 and the second value is 0.

In an optional embodiment provided based on the embodiment shown in FIG. 1, the processing module 110 is configured to generate the MAC PDU corresponding to the UE. The MAC PDU includes the feedback information.

The sending module 130 is configured to scramble control channel indication information by using a designated identifier. The designated identifier is an identifier corresponding to the m UEs, and the control channel indication information is used to indicate a resource location of a downlink resource that carries the MAC PDU.

The sending module 130 is configured to send the control channel indication information to the UE.

The sending module 130 is configured to send the MAC PDU by using the downlink resource indicated by the control channel indication information.

In an optional embodiment provided based on the embodiment shown in FIG. 1, the designated identifier is a contention based radio network temporary identifier (CB-RNTI).

Alternatively, the designated identifier is a transmission time interval radio network identifier (TTI-RNTI). The TTI-RNTI is generated according to a resource location of the uplink shared resource.

In an optional embodiment provided based on the embodiment shown in FIG. 1, the processing module 110 is further configured to allocate respective corresponding second random numbers to the m UEs. The second random number is a random number used for determining, when the feedback information does not include the identifier of the UE, whether the uplink data is re-sent on a first available uplink shared resource.

Figure 2:
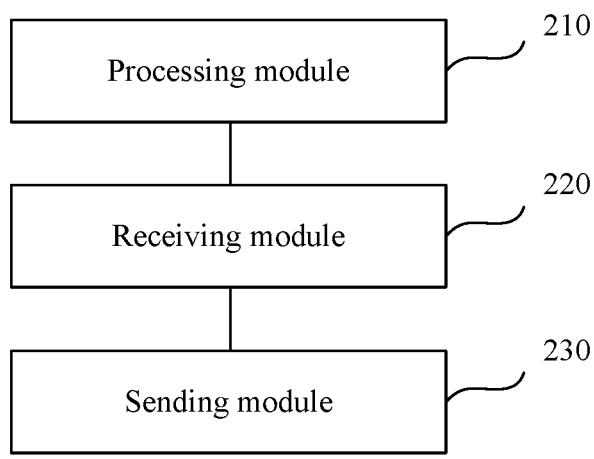
FIG. 2 is a block diagram of a feedback information sending apparatus according to another aspect of the present disclosure.

Referring to FIG. 2, FIG. 2 shows a block diagram of a feedback information sending apparatus according to another aspect of the present disclosure. The feedback information sending apparatus may be implemented as all or a part of an eNB by using software, hardware, or a combination of software and hardware. The feedback information sending apparatus may include a processing module 210, a receiving module 220, and a sending module 230.

The processing module 210 is configured to allocate a same uplink shared resource and a same DM-RS to m UEs, where m≥2.

The receiving module 220 is configured to receive uplink data by using the DM-RS. The uplink data includes an UE identifier, identifiers of different UEs represent the different UEs, and the UE represented by the identifier of the UE is at least one of the m UEs.

The processing module 210 is configured to calculate an agreed feedback location. The agreed feedback location is obtained according to a resource location of the uplink shared resource and the DM-RS.

In this embodiment, the processing module 210 is further configured to calculate an offset of the UE. The offset of the UE is obtained according to the identifier of the UE.

The sending module 230 is configured to send acknowledgement information ACK at a resource location of a downlink resource. The resource location of the downlink resource is indicated by a combination of the agreed feedback location and the offset.

In conclusion, according to the feedback information sending apparatus provided in this embodiment, the eNB allocates the same uplink shared resource and DM-RS to the m UEs; the eNB receives the uplink data on the uplink shared resource by using the DM-RS; the eNB obtains the agreed feedback location by means of calculation according to the resource location of the uplink shared resource and the DM-RS, and obtains, by means of calculation according to the identifier of each UE, the offset corresponding to the UE; and for each UE, the eNB sends the acknowledgement information ACK to the UE on the downlink resource indicated by the combination of the agreed feedback location and the offset. This resolves a prior-art problem that an eNB cannot correctly send, by using a downlink resource located at an agreed feedback location, feedback information to each UE when the multiple UEs simultaneously send uplink data to the eNB by using a same uplink shared resource and DM-RS, so that each UE is clear about whether the uplink data of the UE is successfully sent.

In an optional embodiment provided based on the embodiment shown in FIG. 2, the processing module 210 is configured to: perform a preset arithmetic operation on the identifier of the UE, and use a result of the preset arithmetic operation as the offset corresponding to the UE.

In an optional embodiment provided based on the embodiment shown in FIG. 2, the resource location of the downlink resource is shown in the following formulas:

$$n_{PHICH}^{group} = (I_{PRB\_RA} + n_{DMRS}) \bmod N_{PHICH}^{group} + I_{PHICH} N_{PHICH}^{group} + f(C\text{-RNTI}),$$

and $$n_{PHICH}^{seq} = (\lfloor I_{PRB\_RA}/N_{PHICH}^{group} \rfloor + n_{DMRS}) \bmod 2N_{SF}^{PHICH} + f(C\text{-RNTI}),$$

where $n_{PHICH}^{group}$ is used to identify a group number of a group to which the downlink resource belongs on a PHICH; $n_{PHICH}^{seq}$ is used to identify an orthogonal sequence number of the downlink resource in the group on the PHICH; $n_{DMRS}$ is used to identify a DM-RS sequence that is last indicated by a physical downlink control channel (PDCCH) to the UE; $N_{PHICH}^{group}$ is used to identify a quantity of groups on the PHICH; $N_{SF}^{PHICH}$ is a spreading factor used for modulating the PHICH; and f(C-RNTI) is the offset corresponding to the UE, where $$I_{PHICH} = \begin{cases} 1 & \text{When an uplink-downlink configuration in a } TDD \text{ mode is 0 and the uplink data is sent in a subframe 4 or subframe 9 on a physical uplink shared channel } PUSCH \\ 0 & \text{Otherwise} \end{cases}$$

-continued and $$I_{PRB\_RA} = \begin{cases} I_{PRB\_RA}^{lowest\_index}, & \text{When the uplink shared resource is the first } TB \text{ transmitted on the } PUSCH \\ I_{PRB\_RA}^{lowest\_index} + 1, & \text{When the uplink shared resource is the second } TB \text{ transmitted on the } PUSCH \end{cases}, \text{where}$$

$I_{PRB\_RA}^{lowest\_index}$ is used to identify a lowest physical resource block (PRB) index corresponding to a first timeslot in the PUSCH transmission process.

In an optional embodiment provided based on the embodiment shown in FIG. 2, the processing module 210 is configured to calculate the offset of the UE, where $$f(C\text{-RNTI}) = (C\text{-RNTI}) \% M,$$

and M is a positive integer.

Figure 3:
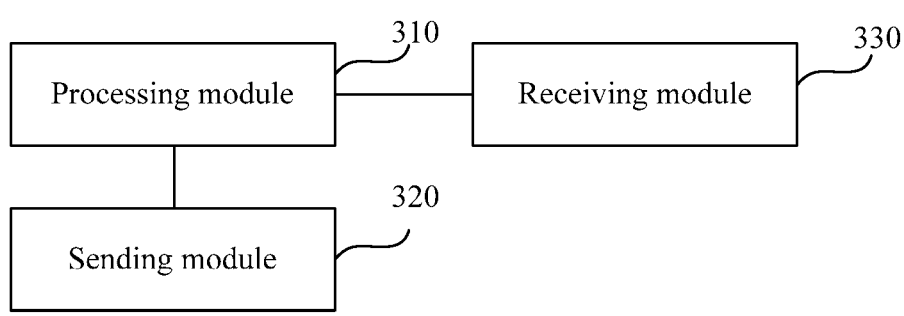
FIG. 3 is a block diagram of a feedback information receiving apparatus according to an aspect of the present disclosure.

Referring to FIG. 3, FIG. 3 shows a block diagram of a feedback information receiving apparatus according to an aspect of the present disclosure. The feedback information receiving apparatus may be implemented as all or a part of UE by using software, hardware, or a combination of software and hardware. The feedback information receiving apparatus may include a processing module 310, a sending module 320, and a receiving module 330.

The processing module 310 is configured to determine an uplink shared resource of UE. The uplink shared resource is the same as uplink shared resources of the other m−1 UEs, where m≥2.

The sending module 320 is configured to send uplink data by using the uplink shared resource. The uplink data includes an identifier of the UE.

The receiving module 330 is configured to receive feedback information by using a MAC PDU. The feedback information includes n identifiers, different identifiers in the n identifiers represent different UEs, the identifiers indicate that uplink data of then UEs is successfully received by an eNB, and m≥n≥1.

In conclusion, according to the feedback information sending apparatus provided in this embodiment, the uplink shared resource of the user equipment UE is determined, where the uplink shared resource is the same as the uplink shared resource of the other m−1 UEs, and m≥2; the uplink data is sent by using the uplink shared resource, where the uplink data includes the identifier of the UE; the feedback information is received by using the Media Access Control protocol data unit MAC PDU, where the feedback information includes the n identifiers, different identifiers in the n identifiers represent different UEs, the identifiers indicate that the uplink data of the n UEs is successfully received by the eNB, and m≥n≥1. This resolves a prior-art problem that an eNB cannot correctly send, by using a downlink resource located at an agreed feedback location, feedback information to each UE when the multiple UEs simultaneously send uplink data to the eNB by using a same uplink shared resource and DM-RS, so that each UE is clear about whether the uplink data of the UE is successfully sent.

Figure 4:
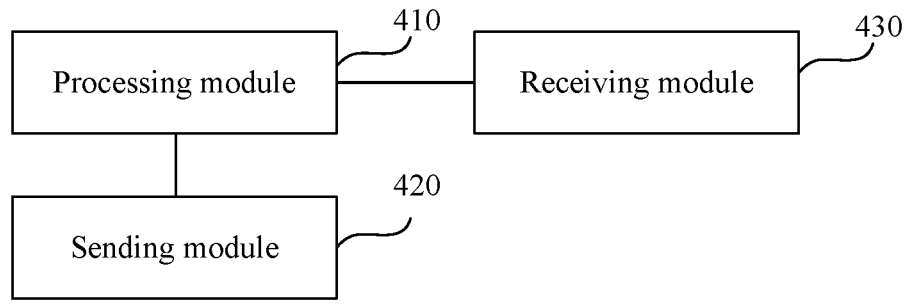
FIG. 4 is a block diagram of a feedback information receiving apparatus according to another aspect of the present disclosure.

Referring to FIG. 4, FIG. 4 shows a block diagram of a feedback information receiving apparatus according to another aspect of the present disclosure. The feedback information sending apparatus may be implemented as all or a part of UE by using software, hardware, or a combination of software and hardware. The feedback information receiving apparatus may include a processing module 410, a sending module 420, and a receiving module 430.

The processing module 410 is configured to determine an uplink shared resource of UE. The uplink shared resource is the same as uplink shared resources of the other m−1 UEs, where m≥2.

The sending module 420 is configured to send uplink data by using the uplink shared resource. The uplink data includes an identifier of the UE.

The receiving module 430 is configured to receive feedback information by using a MAC PDU. The feedback information includes n identifiers, different identifiers in the n identifiers represent different UEs, the identifiers indicate that uplink data of then UEs is successfully received by an eNB, and m≥n≥1.

In an optional embodiment provided based on the embodiment shown in FIG. 4, the processing module 410 is further configured to generate the uplink data. The uplink data includes the identifier and buffer status information that are of the UE. The buffer status information of the UE is used to indicate information about remaining to-be-sent data.

The sending module 420 is configured to send the uplink data to the eNB.

In an optional embodiment provided based on the embodiment shown in FIG. 4, the apparatus further includes:

the processing module 410 is further configured to: read the $i^{th}$ identifier and the corresponding uplink scheduling grant from the feedback information; and detect whether the $i^{th}$ identifier is the identifier of the UE, where n≥i≥1.

The sending module 420 is further configured to: when the $i^{th}$ identifier is the identifier of the UE, send the remaining to-be-sent data according to the uplink scheduling grant.

In an optional embodiment provided based on the embodiment shown in FIG. 4, the processing module 410 is further configured to: read a quantity of significant bits and a bit mapping sequence from the feedback information, where the quantity of significant bits is used to indicate a quantity of significant bits in the bit mapping sequence, and the bit mapping sequence is a bit sequence with a fixed bit quantity; when the $i^{th}$ bit in the bit mapping sequence is a first value and is significant, read the $i^{th}$ identifier and a corresponding uplink scheduling grant from the feedback information; and detect whether the $i^{th}$ identifier is the identifier of the UE.

The sending module 420 is further configured to: when the $i^{th}$ identifier is the identifier of the UE, send the remaining to-be-sent data according to the uplink scheduling grant.

The processing module 410 is further configured to: when the $i^{th}$ bit in the bit mapping sequence is a second value and is significant, read the $i^{th}$ identifier from the feedback information; and detect whether the $i^{th}$ identifier is the identifier of the UE. If the $i^{th}$ identifier is the identifier of the UE, it indicates that the eNB successfully receives the uplink data of the UE.

In an optional embodiment provided based on the embodiment shown in FIG. 4, the sending module 420 is further configured to: when the identifier of the UE is not in the identifiers included in the feedback information, that is, when the eNB fails in receiving the uplink data of the UE, re-send the uplink data.

In an optional embodiment provided based on the embodiment shown in FIG. 4, the processing module 410 is configured to randomly generate a first random number when a first available uplink shared resource exists.

The processing module 410 is configured to: read a second random number from a buffer, where the second random number is pre-allocated by the eNB; and determine whether a value relationship between the first random number and the second random number meets a preset condition.

The sending module 420 is configured to: when the value relationship between the first random number and the second random number meets the preset condition, re-send the uplink data on the first available uplink shared resource.

The processing module 410 is configured to: when the value relationship between the first random number and the second random number does not meet the preset condition, re-generate a first random number.

In an optional embodiment provided based on the embodiment shown in FIG. 4, the processing module 410 is configured to randomly generate a random backoff time.

The sending module 420 is configured to re-send the uplink data on a first available uplink shared resource after the random backoff time expires.

In an optional embodiment provided based on the embodiment shown in FIG. 4, the receiving module 430 is configured to receive the control channel indication information.

The receiving module 430 is configured to descramble the control channel indication information by using a designated identifier. The designated identifier is an identifier corresponding to m UEs, and the control channel indication information is used to indicate a resource location of a downlink resource that carries the MAC PDU.

The receiving module 430 is configured to receive the MAC PDU by using the downlink resource indicated by the control channel indication information. The MAC PDU includes the feedback information.

In an optional embodiment provided based on the embodiment shown in FIG. 4, the designated identifier is a CB-RNTI or a TTI-RNTI. The TTI-RNTI is generated according to a resource location of the uplink shared resource.

Figure 5:
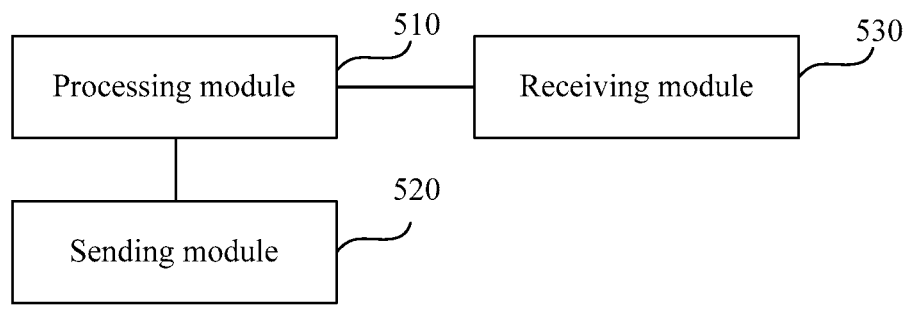
FIG. 5 is a block diagram of a feedback information receiving apparatus according to still another aspect of the present disclosure.

Referring to FIG. 5, FIG. 5 shows a block diagram of a feedback information receiving apparatus according to an aspect of the present disclosure. The feedback information receiving apparatus may be implemented as all or a part of UE by using software, hardware, or a combination of software and hardware. The feedback information receiving apparatus may include a processing module 510, a sending module 520, and a receiving module 530.

The processing module 510 is configured to determine an uplink shared resource and a DM-RS that are of UE. The uplink shared resource and the DM-RS are the same as an uplink shared resource and a DM-RS that are allocated by an eNB to m UEs, where m≥2.

The sending module 520 is configured to send uplink data by using the uplink shared resource. The uplink data includes an identifier and the DM-RS that are of the UE.

The processing module 510 is further configured to calculate an agreed feedback location. The agreed feedback location is obtained according to a resource location of the uplink shared resource and the DM-RS.

The processing module 510 is further configured to calculate an offset of the UE. The offset of the UE is obtained according to the identifier of the UE.

The receiving module 530 is configured to receive acknowledgement information ACK at a resource location of a downlink resource. The resource location of the downlink resource is indicated by a combination of the agreed feedback location and the offset.

In conclusion, according to the feedback information sending apparatus provided in this embodiment, the eNB allocates the same uplink shared resource and DM-RS to the m UEs; the eNB receives the uplink data on the uplink shared resource by using the DM-RS; the eNB obtains the agreed feedback location by means of calculation according to the resource location of the uplink shared resource and the DM-RS, and obtains, by means of calculation according to the identifier of each UE, the offset corresponding to the UE; and for each UE, the eNB sends the acknowledgement information ACK to the UE on the downlink resource indicated by the combination of the agreed feedback location and the offset. This resolves a prior-art problem that an eNB cannot correctly send, by using a downlink resource located at an agreed feedback location, feedback information to each UE when the multiple UEs simultaneously send uplink data to the eNB by using a same uplink shared resource and DM-RS, so that each UE is clear about whether the uplink data of the UE is successfully sent.

In an optional embodiment provided based on the embodiment shown in FIG. 5, the processing module 510 is further configured to: perform a preset arithmetic operation on the identifier of the UE, and use a result of the preset arithmetic operation as the offset corresponding to the UE.

In an optional embodiment provided based on the embodiment shown in FIG. 5, the resource location of the downlink resource is shown in the following formulas:

$$n_{PHICH}^{group} = (I_{PRB\_RA} + n_{DMRS}) \bmod N_{PHICH}^{group} + I_{PHICH} N_{PHICH}^{group} + f(C\text{-RNTI}),$$

and $$n_{PHICH}^{seq} = (\lfloor I_{PRB\_RA} / N_{PHICH}^{group} \rfloor + n_{DMRS}) \bmod 2N_{SF}^{PHICH} + f(C\text{-RNTI}),$$

where $n_{PHICH}^{group}$ is used to identify a group number of a group to which the downlink resource belongs on a PHICH; $n_{PHICH}^{seq}$ is used to identify an orthogonal sequence number of the downlink resource in the group on the PHICH; $n_{DMRS}$ is used to identify a DM-RS sequence that is last indicated by a PDCCH to the UE; $N_{PHICH}^{group}$ is used to identify a quantity of groups on the PHICH; $N_{SF}^{PHICH}$ is a spreading factor used for modulating the PHICH; and f(C-RNTI) is the offset corresponding to the UE, where $$I_{PHICH} = \begin{cases} 1 & \text{When an uplink-downlink configuration in a } TDD \text{ mode is 0 and the uplink data is sent in a subframe 4 or subframe 9 on a physical uplink shared channel } PUSCH \\ 0 & \text{Otherwise} \end{cases},$$

and $$I_{PRB\_RA} = \begin{cases} I_{PRB\_RA}^{lowest\_index}, & \text{When the uplink shared resource is the first } TB \text{ transmitted on the } PUSCH \\ I_{PRB\_RA}^{lowest\_index} + 1, & \text{When the uplink shared resource is the second } TB \text{ transmitted on the } PUSCH \end{cases}, \text{where}$$

$I_{PRB\_RA}^{lowest\_index}$ is used to identify a lowest PRB index corresponding to a first timeslot in the PUSCH transmission process.

In an optional embodiment provided based on the embodiment shown in FIG. 5, the processing module 510 is configured to calculate the offset of the UE, where $$f(C\text{-RNTI}) = (C\text{-RNTI}) \% M,$$

and M is a positive integer.

Figure 6:
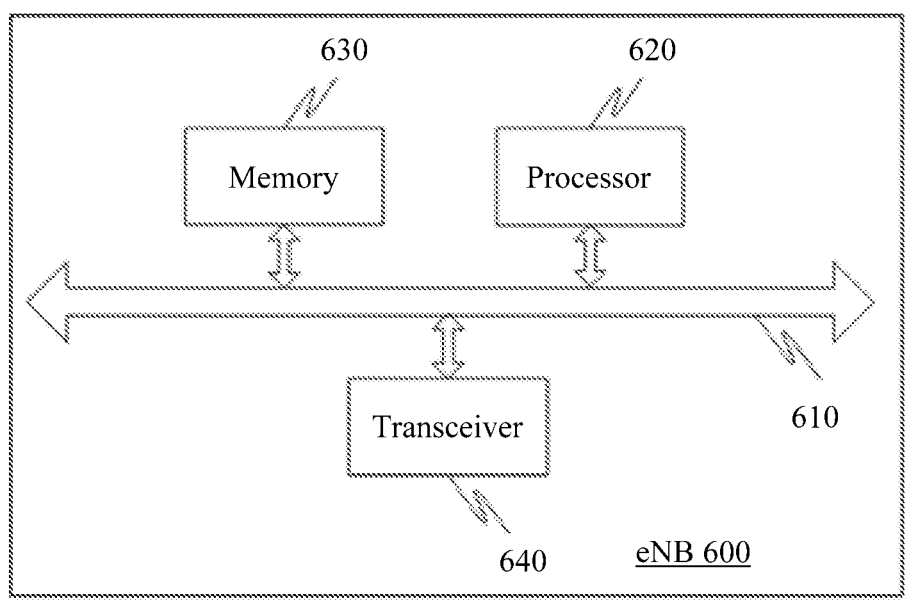
FIG. 6 is a structural block diagram of an eNB according to an aspect of the present disclosure.

Referring to FIG. 6, FIG. 6 shows a structural block diagram of an eNB according to an aspect of the present disclosure. As shown in FIG. 6, an eNB 600 includes a bus 610, and a processor 620, a memory 630, and a transceiver 640 that perform communication by using the bus 610. The memory 630 is configured to store at least one instruction, and as configured, the instruction is executed by the processor 620.

The processor 620 is configured to allocate a same uplink shared resource to m UEs, where m≥2.

The processor 620 is further configured to control the transceiver 640 to receive uplink data on the uplink shared resource. The uplink data includes an UE identifier, identifiers of different UEs represent the different UEs, and the UE represented by the identifier of the UE is at least one of the m UEs.

The processor 620 is further configured to determine n UEs. Uplink data of the n UEs is successfully received, and m≥n≥1

The processor 620 is further configured to generate feedback information. The feedback information includes n identifiers, and different identifiers represent different UEs.

The processor 620 is further configured to control the transceiver 640 to send the feedback information by using a Media Access Control protocol data unit MAC PDU.

In an optional embodiment provided based on the embodiment shown in FIG. 6, the processor 620 is configured to obtain the identifiers of the UEs and buffer status information of the UEs by means of decoding.

The processor 620 is configured to generate uplink scheduling grants of the UEs. The uplink scheduling grants of the UEs are generated according to the buffer status information of the UEs.

The processor 620 is configured to generate the feedback information. The feedback information includes the n identifiers and the uplink scheduling grants corresponding to the UEs.

In an optional embodiment provided based on the embodiment shown in FIG. 6, x pieces of the uplink data include buffer status information of the UE, n≥x≥1, and the buffer status information of the UE is used to indicate information about remaining to-be-sent data.

The processor 620 is configured to obtain, by means of decoding, the identifiers of the n UEs and buffer status information corresponding to x UEs.

The processor 620 is configured to generate uplink scheduling grants respectively corresponding to the x UEs. The x uplink scheduling grants are generated according to the buffer status information of the x UEs.

The processor 620 is configured to generate the feedback information. The feedback information includes the n identifiers and the uplink scheduling grants corresponding to the x UEs.

In an optional embodiment provided based on the embodiment shown in FIG. 6, y pieces of the uplink data include buffer status information of the UE, n≥y≥1, and the buffer status information of the UE is used to indicate information about remaining to-be-sent data.

The processor 620 is configured to obtain, by means of decoding, the identifiers of the n UEs and buffer status information corresponding to y UEs.

The processor 620 is configured to generate uplink scheduling grants respectively corresponding to x UEs, where y>x≥1. The x uplink scheduling grants indicate current available uplink resources, and the x uplink scheduling grants are generated according to buffer status information of the x UEs.

The processor 620 is configured to generate the feedback information. The feedback information includes the n identifiers and the uplink scheduling grants corresponding to the x UEs.

In an optional embodiment provided based on the embodiment shown in FIG. 6, the processor 620 is configured to generate the feedback information. The feedback information includes a quantity of significant bits, a bit mapping sequence, the n identifiers, and the x uplink scheduling grants.

The quantity of significant bits is used to indicate a quantity of significant bits in the bit mapping sequence.

The bit mapping sequence is a bit sequence with a fixed bit quantity.

When the $i^{th}$ bit in the bit mapping sequence is a first value and is significant, it indicates that the $i^{th}$ UE identifier in the feedback information is followed by the corresponding uplink scheduling grant with a fixed bit quantity.

When the $i^{th}$ bit in the bit mapping sequence is a second value and is significant, it indicates that the $i^{th}$ UE identifier in the feedback information is not followed by the corresponding uplink scheduling grant with a fixed bit quantity.

The first value is 0 and the second value is 1, or the first value is 1 and the second value is 0.

In an optional embodiment provided based on the embodiment shown in FIG. 6, the processor 620 is configured to generate the MAC PDU corresponding to the UE. The MAC PDU includes the feedback information.

The processor 620 is configured to scramble control channel indication information by using a designated identifier. The designated identifier is an identifier corresponding to the m UEs, and the control channel indication information is used to indicate a resource location of a downlink resource that carries the MAC PDU.

The processor 620 is configured to control the transceiver 640 to send the control channel indication information to the UE.

The processor 620 is configured to control the transceiver 640 to send the MAC PDU by using the downlink resource indicated by the control channel indication information.

In an optional embodiment provided based on the embodiment shown in FIG. 6, the designated identifier is a CB-RNTI or a TTI-RNTI. The TTI-RNTI is generated according to a resource location of the uplink shared resource.

In an optional embodiment provided based on the embodiment shown in FIG. 6, the processor 620 is further configured to allocate respective corresponding second random numbers to the m UEs. The second random number is a random number used for determining, when the feedback information does not include the identifier of the UE, whether the uplink data is re-sent on a first available uplink shared resource.

Figure 7:
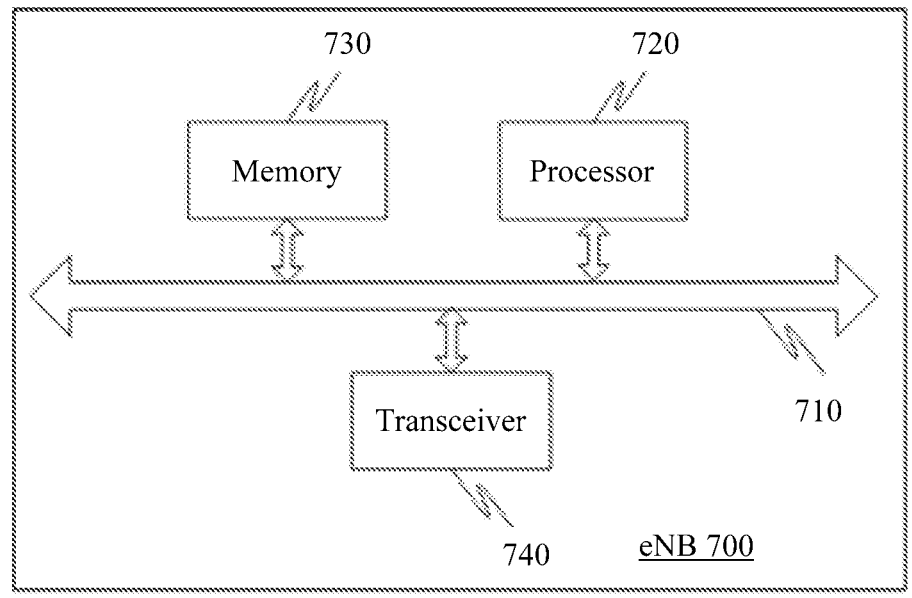
FIG. 7 is a structural block diagram of an eNB according to another aspect of the present disclosure.

Referring to FIG. 7, FIG. 7 shows a structural block diagram of an eNB according to another aspect of the present disclosure. As shown in FIG. 7, an eNB 700 includes a bus 710, and a processor 720, a memory 730, and a transceiver 740 that perform communication by using the bus 710. The memory 730 is configured to store at least one instruction, and as configured, the instruction is executed by the processor 720.

The processor 720 is configured to allocate a same uplink shared resource and a same DM-RS to m UEs, where m≥2.

The processor 720 is further configured to control the transceiver 740 to receive uplink data by using the DM-RS. The uplink data includes an UE identifier, identifiers of different UEs represent the different UEs, and the UE represented by the identifier of the UE is at least one of the m UEs.

The processor 720 is further configured to calculate an agreed feedback location. The agreed feedback location is obtained according to a resource location of the uplink shared resource and the DM-RS.

The processor 720 is further configured to calculate an offset of the UE. The offset of the UE is obtained according to the identifier of the UE.

The processor 720 is further configured to control the transceiver 740 to send acknowledgement information ACK at a resource location of a downlink resource. The resource location of the downlink resource is indicated by a combination of the agreed feedback location and the offset.

In an optional embodiment provided based on the embodiment shown in FIG. 7, the processor 720 is configured to: perform a preset arithmetic operation on the identifier of the UE, and use a result of the preset arithmetic operation as the offset corresponding to the UE.

In an optional embodiment provided based on the embodiment shown in FIG. 7, the resource location of the downlink resource is shown in the following formulas:

$$n_{PHICH}^{group} = (I_{PRB\_RA} + n_{DMRS}) \bmod N_{PHICH}^{group} + I_{PHICH} N_{PHICH}^{group} F(C\text{-}RNTI),$$

and $$n_{PHICH}^{seq} = (\lfloor I_{PRB\_RA} / N_{PHICH}^{group} \rfloor + n_{DMRS}) \bmod 2N_{SF}^{PHICH} + f(C\text{-}RNTI),$$

where $n_{PHICH}^{group}$ is used to identify a group number of a group to which the downlink resource belongs on a PHICH; $n_{PHICH}^{seq}$ is used to identify an orthogonal sequence number of the downlink resource in the group on the PHICH; $n_{DMRS}$ is used to identify a DM-RS sequence that is last indicated by a PDCCH to the UE; $N_{PHICH}^{group}$ is used to identify a quantity of groups on the PHICH; $N_{SF}^{PHICH}$ is a spreading factor used for modulating the PHICH; and f(C-RNTI) is the offset corresponding to the UE, where $$I_{PHICH} = \begin{cases} 1 & \text{When an uplink-downlink configuration in a } TDD \text{ mode is 0 and the uplink data is sent in a subframe 4 or subframe 9 on a physical uplink shared channel } PUSCH \\ 0 & \text{Otherwise} \end{cases}$$

and $$I_{PRB\_RA} = \begin{cases} I_{PRB\_RA}^{lowest\_index}, & \text{When the uplink shared resource is the first } TB \text{ transmitted on the } PUSCH \\ I_{PRB\_RA}^{lowest\_index} + 1, & \text{When the uplink shared resource is the second } TB \text{ transmitted on the } PUSCH \end{cases}, \text{ where}$$

$I_{PRB\_RA}^{lowest\_index}$ is used to identify a lowest PRB index corresponding to a first timeslot in the PUSCH transmission process.

In an optional embodiment provided based on the embodiment shown in FIG. 7, the processor 720 is configured to calculate the offset of the UE, where $f(C\text{-}RNTI) = (C\text{-}RNTI) \% M,$ and M is a positive integer.

Figure 8:
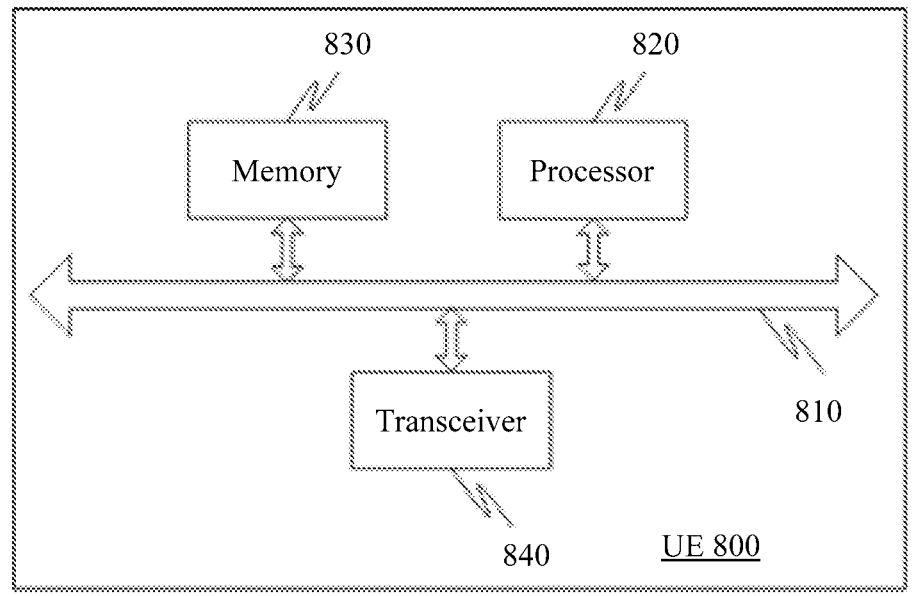
FIG. 8 is a structural block diagram of UE according to an aspect of the present disclosure.

Referring to FIG. 8, FIG. 8 shows a structural block diagram of UE according to an aspect of the present disclosure. As shown in FIG. 8, UE 800 includes a bus 810, and a processor 820, a memory 830, and a transceiver 840 that perform communication by using the bus 810. The memory 830 is configured to store at least one instruction, and as configured, the instruction is executed by the processor 820.

The processor 820 is configured to determine an uplink shared resource of the UE. The uplink shared resource is the same as uplink shared resources of the other m−1 UEs, where m≥2.

The processor 820 is further configured to control the transceiver 840 to send uplink data by using the uplink shared resource. The uplink data includes an identifier of the UE.

The processor 820 is further configured to control the transceiver 840 to receive feedback information by using a MAC PDU. The feedback information includes n identifiers, different identifiers in the n identifiers represent different UEs, the identifiers indicate that uplink data of the n UEs is successfully received by an eNB, and m≥n≥1.

In an optional embodiment provided based on the embodiment shown in FIG. 8, the processor 820 is configured to generate the uplink data. The uplink data includes the identifier and buffer status information that are of the UE. The buffer status information of the UE is used to indicate information about remaining to-be-sent data.

The processor 820 is configured to control the transceiver 840 to send the uplink data to the eNB.

In an optional embodiment provided based on the embodiment shown in FIG. 8, the processor 820 is further configured to read the $i^{th}$ identifier from the feedback information, where n≥i≥1.

The processor 820 is further configured to detect whether the $i^{th}$ identifier is the identifier of the UE. If the $i^{th}$ identifier is the identifier of the UE, it indicates that the eNB successfully receives the uplink data of the UE.

In an optional embodiment provided based on the embodiment shown in FIG. 8, the processor 820 is further configured to read the $i^{th}$ identifier and the corresponding uplink scheduling grant from the feedback information.

The processor 820 is further configured to detect whether the $i^{th}$ identifier is the identifier of the UE, where n≥i≥1.

The processor 820 is further configured to: when the $i^{th}$ identifier is the identifier of the UE, control the transceiver 840 to send the remaining to-be-sent data according to the uplink scheduling grant.

In an optional embodiment provided based on the embodiment shown in FIG. 8, the processor 820 is further configured to read a quantity of significant bits and a bit mapping sequence from the feedback information. The quantity of significant bits is used to indicate a quantity of significant bits in the bit mapping sequence, and the bit mapping sequence is a bit sequence with a fixed bit quantity.

The processor 820 is further configured to: when the $i^{th}$ bit in the bit mapping sequence is a first value and is significant, read the $i^{th}$ identifier and a corresponding uplink scheduling grant from the feedback information.

The processor 820 is further configured to detect whether the $i^{th}$ identifier is the identifier of the UE.

The processor 820 is further configured to: when the $i^{th}$ identifier is the identifier of the UE, control the transceiver 840 to send the remaining to-be-sent data according to the uplink scheduling grant.

The processor 820 is further configured to: when the $i^{th}$ bit in the bit mapping sequence is a second value and is significant, read the $i^{th}$ identifier from the feedback information.

The processor 820 is further configured to detect whether the $i^{th}$ identifier is the identifier of the UE.

If the $i^{th}$ UE identifier is the identifier of the UE, it indicates that the eNB successfully receives the uplink data of the UE.

In an optional embodiment provided based on the embodiment shown in FIG. 8, the processor 820 is configured to: when the identifier of the UE is not in the identifiers included in the feedback information, that is, when the eNB fails in receiving the uplink data of the UE, control the transceiver 840 to re-send the uplink data.

In an optional embodiment provided based on the embodiment shown in FIG. 8, the processor 820 is configured to randomly generate a first random number when a first available uplink shared resource exists.

The processor 820 is configured to read a second random number from a buffer. The second random number is pre-allocated by the eNB.

The processor 820 is configured to determine whether a value relationship between the first random number and the second random number meets a preset condition.

The processor 820 is configured to: when the value relationship between the first random number and the second random number meets the preset condition, control the transceiver 840 to re-send the uplink data on the first available uplink shared resource.

The processor 820 is configured to: when the value relationship between the first random number and the second random number does not meet the preset condition, re-perform the step of randomly generating a first random number when a first available uplink shared resource exists.

In an optional embodiment provided based on the embodiment shown in FIG. 8, the processor 820 is configured to randomly generate a random backoff time.

The processor 820 is configured to control the transceiver 840 to re-send the uplink data on a first available uplink shared resource after the random backoff time expires.

In an optional embodiment provided based on the embodiment shown in FIG. 8, the processor 820 is configured to control the transceiver 840 to receive the control channel indication information.

The processor 820 is configured to descramble the control channel indication information by using a designated identifier. The designated identifier is an identifier corresponding to the m UEs, and the control channel indication information is used to indicate a resource location of a downlink resource that carries the MAC PDU.

The processor 820 is configured to control the transceiver 840 to receive the MAC PDU by using the downlink resource indicated by the control channel indication information. The MAC PDU includes the feedback information.

In an optional embodiment provided based on the embodiment shown in FIG. 8, the designated identifier is a CB-RNTI or a TTI-RNTI. The TTI-RNTI is generated according to a resource location of the uplink shared resource.

Figure 9:
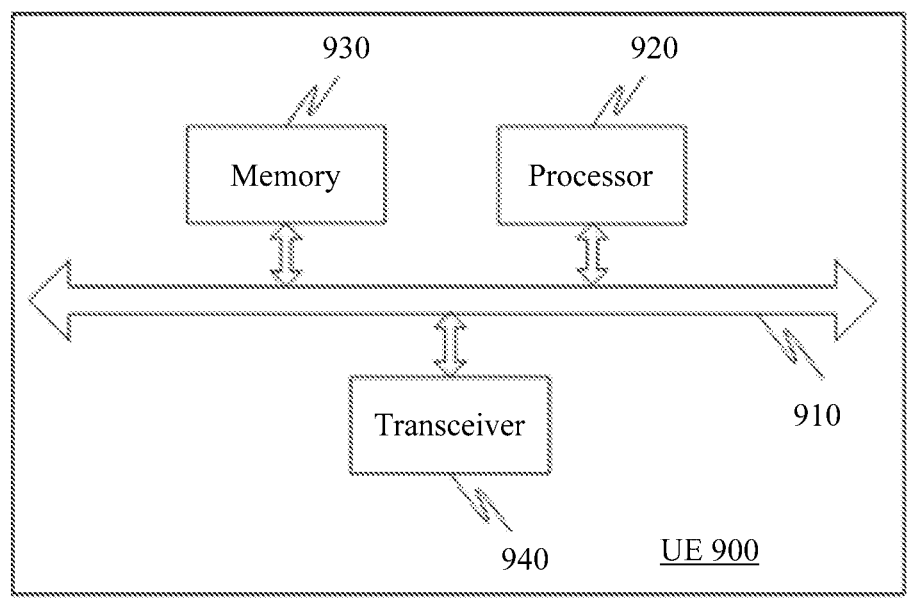
FIG. 9 is a structural block diagram of UE according to another aspect of the present disclosure.

Referring to FIG. 9, FIG. 9 shows a structural block diagram of UE according to another aspect of the present disclosure. As shown in FIG. 9, UE 900 includes a bus 910, and a processor 920, a memory 930, and a transceiver 940 that perform communication by using the bus 910. The memory 930 is configured to store at least one instruction, and as configured, the instruction is executed by the processor 920.

The processor 920 is configured to determine an uplink shared resource and a DM-RS that are of the UE. The uplink shared resource and the DM-RS are the same as an uplink shared resource and a DM-RS that are allocated by an eNB to m user equipments UEs, where m≥2.

The processor 920 is further configured to control the transceiver 940 to send uplink data by using the uplink shared resource. The uplink data includes an identifier and the DM-RS that are of the UE.

The processor 920 is further configured to calculate an agreed feedback location. The agreed feedback location is obtained according to a resource location of the uplink shared resource and the DM-RS.

The processor 920 is further configured to calculate an offset of the UE. The offset of the UE is obtained according to the identifier of the UE.

The processor 920 is further configured to control the transceiver 940 to receive acknowledgement information ACK at a resource location of a downlink resource. The resource location of the downlink resource is indicated by a combination of the agreed feedback location and the offset.

In an optional embodiment provided based on the embodiment shown in FIG. 9, the processor 920 is configured to:

perform a preset arithmetic operation on the identifier of the UE, and use a result of the preset arithmetic operation as the offset corresponding to the UE.

In an optional embodiment provided based on the embodiment shown in FIG. 9, the resource location of the downlink resource is shown in the following formulas:

$$n_{PHICH}^{group} = (I_{PRB\_RA} + n_{DMRS}) \bmod N_{PHICH}^{group} + I_{PHICH} N_{PHICH}^{group} + f(C\text{-RNTI}),$$

and $$n_{PHICH}^{seq} = (\lfloor I_{PRB\_RA} / N_{PHICH}^{group} \rfloor + n_{DMRS}) \bmod 2N_{SF}^{PHICH} + f(C\text{-RNTI}),$$

where $n_{PHICH}^{group}$ is used to identify a group number of a group to which the downlink resource belongs on a PHICH; $n_{PHICH}^{seq}$ is used to identify an orthogonal sequence number of the downlink resource in the group on the PHICH; $n_{DMRS}$ is used to identify a DM-RS sequence that is last indicated by a PDCCH to the UE; $N_{PHICH}^{group}$ is used to identify a quantity of groups on the PHICH; $N_{SF}^{PHICH}$ is a spreading factor used for modulating the PHICH; and f(C-RNTI) is the offset corresponding to the UE, where $$I_{PHICH} = \begin{cases} 1 & \text{When an uplink-downlink configuration in a } TDD \text{ mode is 0 and the uplink data is sent in a subframe 4 or subframe 9 on a physical uplink shared channel } PUSCH \\ 0 & \text{Otherwise} \end{cases},$$

and $$I_{PRB\_RA} = \begin{cases} I_{PRB\_RA}^{lowest\_index}, & \text{When the uplink shared resource is the first } TB \text{ transmitted on the } PUSCH \\ I_{PRB\_RA}^{lowest\_index} + 1, & \text{When the uplink shared resource is the second } TB \text{ transmitted on the } PUSCH \end{cases}, \text{ where}$$

$I_{PRB\_RA}^{lowest\_index}$ is used to identify a lowest PRB index corresponding to a first timeslot in the PUSCH transmission process.

In an optional embodiment provided based on the embodiment shown in FIG. 9, the processor 920 is configured to calculate the offset of the UE, where $f(C\text{-RNTI}) = (C\text{-RNTI}) \% M,$ and M is a positive integer.

Figure 10:
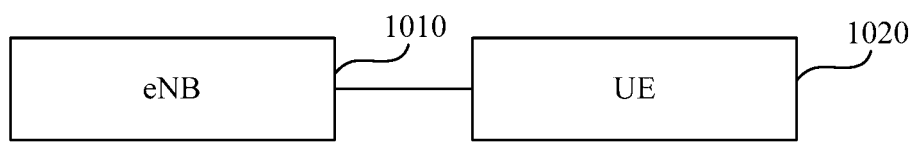
FIG. 10 is a block diagram of a feedback information sending and receiving system according to an aspect of the present disclosure.

Referring to FIG. 10, FIG. 10 shows a feedback information sending and receiving system according to an aspect of the present disclosure. The feedback information sending and receiving system includes an eNB 1010 and UE 1020.

The eNB 1010 includes the feedback information sending apparatus provided in either FIG. 1 or FIG. 2, or the eNB 1010 includes the eNB provided in either FIG. 6 or FIG. 7.

The UE 1020 includes the feedback information receiving apparatus provided in any one of the aspect of FIG. 3, the aspect of FIG. 4, or the aspect of FIG. 5, or the UE 1020 includes the UE provided in either the aspect of FIG. 8 or the aspect of FIG. 9.

Figure 11:
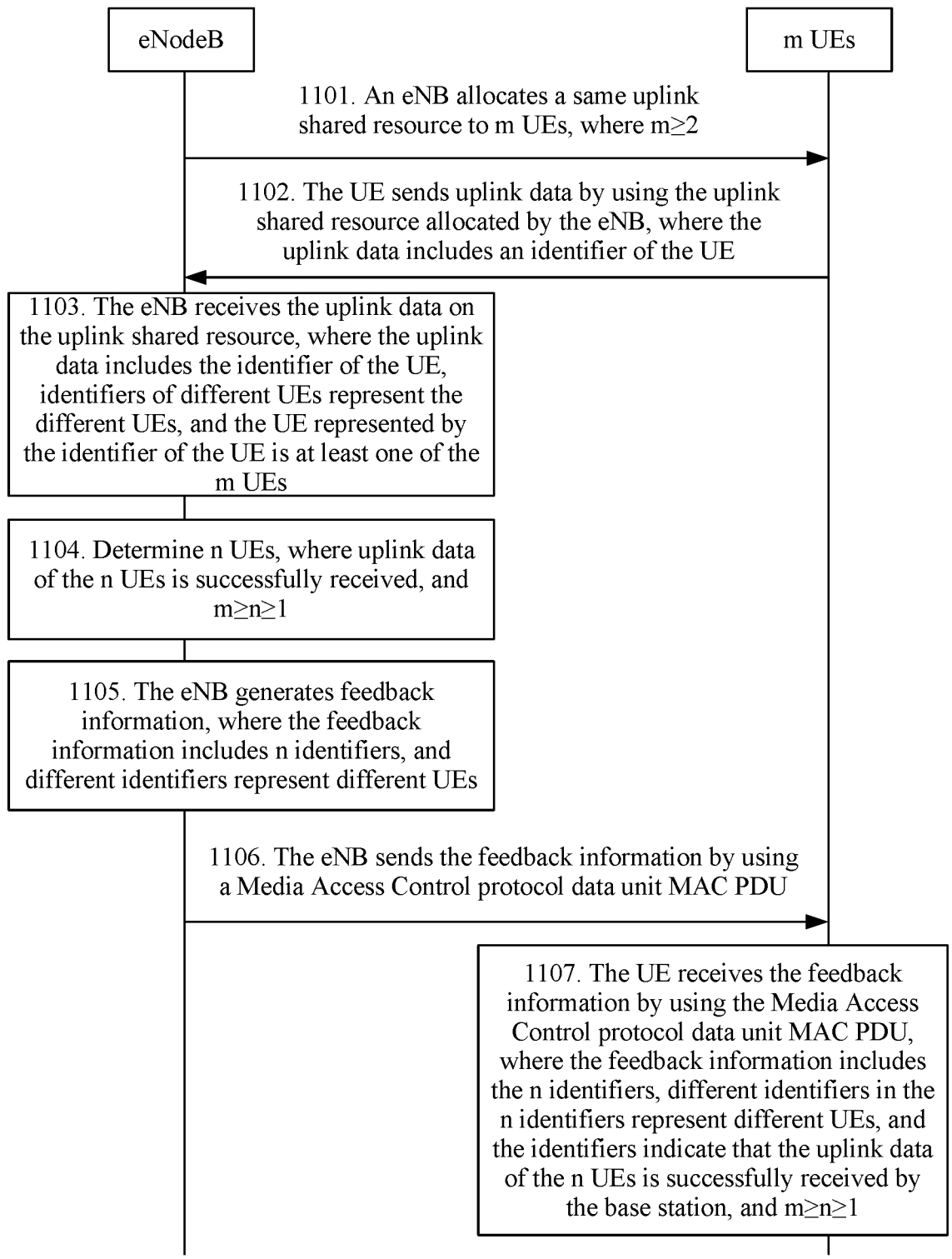
FIG. 11 is a flowchart of a feedback information sending method according to an aspect of the present disclosure.

Referring to FIG. 11, FIG. 11 shows a flowchart of a feedback information sending method according to an aspect of the present disclosure. The feedback information sending method includes the following steps.

Step 1101: An eNB allocates a same uplink shared resource to m UEs, where m≥2.

In LTE, an uplink shared resource is a time-frequency resource on a PUSCH channel, and multiple UEs may share a same uplink shared resource to transmit data.

Generally, when allocating a same uplink shared resource to the m UEs, the eNB also allocates a same DM-RS to the m UEs. However, in this embodiment, even if the eNB allocates different DM-RSs to the m UEs, this embodiment can be normally implemented. Therefore, whether the m UEs use a same DM-RS is not limited in this embodiment.

Correspondingly, the UE determines an uplink shared resource of the UE. The uplink shared resource is the same as uplink shared resources of the other m−1 UEs, where m≥2. Specifically, the UE receives configuration information that is related to the uplink shared resource and that is sent by the eNB, and determines the uplink shared resource of the UE according to the received configuration information.

In other embodiments, if the eNB and the UE agree in advance on a configuration manner of an uplink shared resource, the UE may determine the uplink shared resource by itself according to the configuration manner agreed in advance.

Step 1102: The UE sends uplink data by using the uplink shared resource allocated by the eNB, where the uplink data includes an identifier of the UE.

For example, the eNB allocates a same uplink shared resource to ten UEs. If three UEs in the ten UEs need to send respective uplink data simultaneously, the three UEs that need to send the uplink data send the respective uplink data to the eNB on the same uplink shared resource simultaneously.

In addition, all the uplink data sent by the three UEs include an identifier of the corresponding UE. That is, the uplink data of each UE includes the identifier of the UE and data information sent by the UE. The UE may further send, on the uplink shared resource, a DM-RS corresponding to the UE, so that the eNB can decode the uplink data.

Step 1103: The eNB receives the uplink data on the uplink shared resource, where the uplink data includes the identifier of the UE, identifiers of different UEs represent the different UEs, and the UE represented by the identifier of the UE is at least one of the m UEs.

The eNB performs channel estimation by using the DM-RS on the uplink shared resource, and obtains, by means of decoding, the uplink data from the uplink shared resource according to a result of the channel estimation. The uplink data includes the identifier of the UE and the data information sent by the UE.

Optionally, the identifier is a C-RNTI of the UE.

Step 1104: Determine n UEs, where uplink data of the n UEs is successfully received, and m≥n≥1.

The eNB determines, according to the successfully received uplink data that includes identifiers of the UEs, the UE that sends the uplink data.

Step 1105: The eNB generates feedback information, where the feedback information includes n identifiers, and different identifiers represent different UEs.

The eNB generates, according to the successfully received uplink data that includes the identifiers of the UEs, the feedback information that includes the corresponding identifiers.

Step 1106: The eNB sends the feedback information by using a MAC PDU.

Step 1107: The UE receives the feedback information by using the MAC PDU, where the feedback information includes the n identifiers, different identifiers in the n identifiers represent different UEs, the identifiers indicate that the uplink data of the n UEs is successfully received by the base station, and m≥n≥1.

In conclusion, according to the feedback information sending method provided in this embodiment, the eNB allocates the same uplink shared resource to the m UEs, where m≥2; the eNB receives, on the uplink shared resource, the uplink data sent by at least one of the UEs, where the uplink data of each UE includes the identifier of the respective corresponding UE, and m≥n≥1; the eNB generates the feedback information according to the n pieces of the successfully received uplink data, where the feedback information includes the n identifiers; and the eNB sends the feedback information by using the MAC PDU. This resolves a prior-art problem that an eNB cannot correctly send feedback information to different UEs according to an agreed downlink resource when the multiple UEs send uplink data by using a same uplink shared resource and DM-RS, so that each UE is clear about whether the uplink data of the UE is successfully sent.

It should be noted that the steps related to an eNB side in the aspect of FIG. 11 may be independently implemented as a feedback information sending method from a perspective of the eNB side, and the steps related to a UE side may be independently implemented as a feedback information receiving method from a perspective of the UE side.

Figure 12:
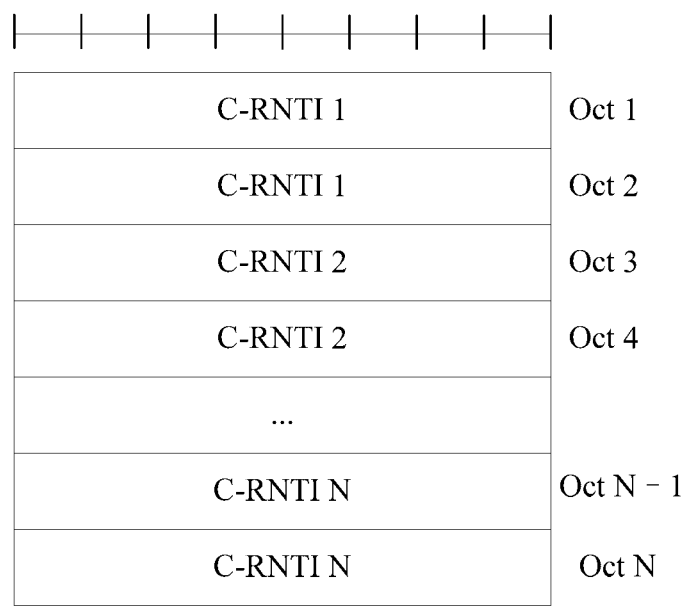
FIG. 12 is a schematic diagram of a feedback information format according to an aspect of the present disclosure.

A schematic diagram of a feedback information format in this embodiment is shown in FIG. 12. FIG. 12 shows feedback information that includes n identifiers.

If an identifier is represented by a C-RNTI, C-RNTI i represents the $i^{th}$ identifier in the feedback information. Each C-RNTI occupies 16 bits, and each Oct is 8 bits. Therefore, each identifier C-RNTI in the feedback information occupies two octets.

Figure 13A:
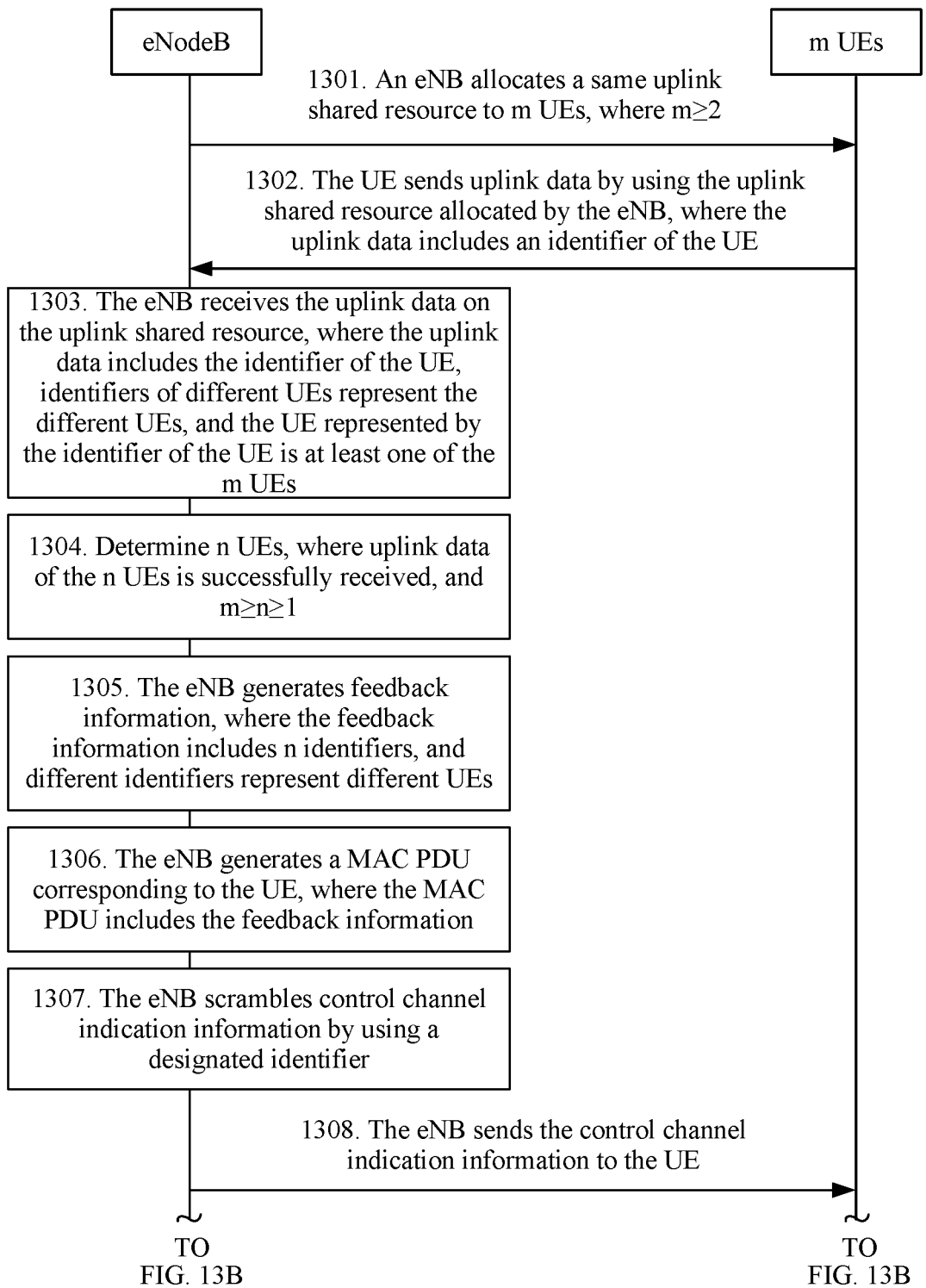
FIG. 13A and FIG. 13B are a flowchart of a feedback information sending method according to another aspect of the present disclosure.
Figure 13B:
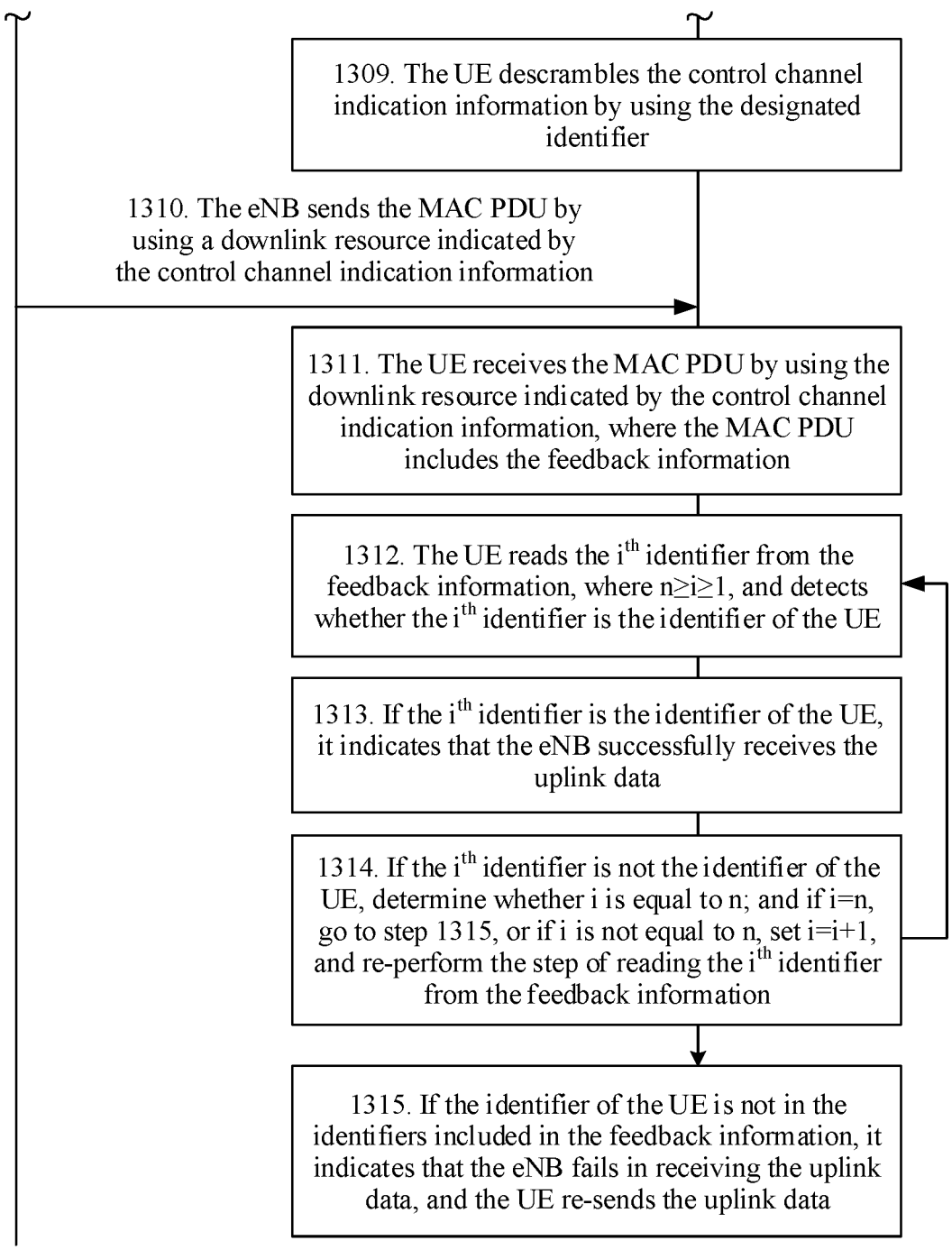

Referring to FIG. 13A and FIG. 13B, FIG. 13A and FIG. 13B show a flowchart of a feedback information sending method according to an aspect of the present disclosure. The feedback information sending method includes the following steps.

Step 1301: An eNB allocates a same uplink shared resource to m UEs, where m≥2.

Correspondingly, the UE determines an uplink shared resource of the UE. The uplink shared resource is the same as uplink shared resources of the other m−1 UEs, where m≥2.

Step 1302: The UE sends uplink data by using the uplink shared resource allocated by the eNB, where the uplink data includes an identifier of the UE.

Step 1303: The eNB receives the uplink data on the uplink shared resource, where the uplink data includes the identifier of the UE, identifiers of different UEs represent the different UEs, and the UE represented by the identifier of the UE is at least one of the m UEs.

Step 1304: Determine n UEs, where uplink data of the n UEs is successfully received, and m≥n≥1.

Step 1305: The eNB generates feedback information, where the feedback information includes n identifiers, and different identifiers represent different UEs.

Step 1301 to step 1305 are the same as step 1101 to step 1105, and reference is made to the embodiment shown in FIG. 11.

Step 1306: The eNB generates a MAC PDU corresponding to the UE, where the MAC PDU includes the feedback information.

The eNB generates, according to the n pieces of the successfully received uplink data, the feedback information that includes the n identifiers, and the eNB generates, by using the feedback information that includes the n identifiers, the MAC PDU corresponding to the UE. The MAC PDU includes the feedback information.

Step 1307: The eNB scrambles control channel indication information by using a designated identifier.

The designated identifier is an identifier corresponding to the m UEs, and the control channel indication information is used to indicate a resource location of a downlink resource that carries the MAC PDU.

The designated identifier is the identifier corresponding to the m UEs. In other words, the designated identifier is an identifier shared by the m UEs.

Optionally, the designated identifier is a CB-RNTI or a TTI-RNTI.

The CB-RNTI is an identifier pre-allocated by the eNB in a contention based uplink data transmission mode.

The TTI-RNTI is related to a resource location of the uplink shared resource in step 1302.

Optionally, TTI-RNTI=a+suf_id+b*feq_id, where suf_id is a subframe number corresponding to the uplink shared resource, feq_id is a least significant bit in a physical resource block corresponding to the uplink shared resource, and both a and b are positive integers. For example, a=1, and b=10.

The control channel indication information is used to indicate the resource location of the downlink resource on a PUSCH channel, and the downlink resource indicated by the control channel indication information is used to carry and send the MAC PDU. The eNB first sends the control channel indication information by using a PDCCH. That is, the eNB scrambles the control channel indication information of the MAC PDU by using the designated identifier, and sends the scrambled control channel indication information to the UE by using the PDCCH channel.

Step 1308: The eNB sends the control channel indication information to the UE.

Correspondingly, the UE receives the control channel indication information sent by the eNB.

Step 1309: The UE descrambles the control channel indication information by using the designated identifier.

The designated identifier is the identifier corresponding to the m UEs, and the control channel indication information is used to indicate the resource location of the downlink resource that carries the MAC PDU.

The UE obtains, by means of descrambling on the PDCCH channel by using the designated identifier, the resource location of the downlink resource indicated by the control channel indication information. Only the UE that has the designated identifier can receive the control channel indication information.

Step 1310: The eNB sends the MAC PDU by using a downlink resource indicated by the control channel indication information.

The eNB sends the MAC PDU by using the downlink resource indicated by the control channel indication information on the PDCCH.

Step 1311: The UE receives the MAC PDU by using the downlink resource indicated by the control channel indication information, where the MAC PDU includes the feedback information.

The UE obtains the feedback information from the MAC PDU by means of decoding.

Step 1312: The UE reads the $i^{th}$ identifier from the feedback information, where n≥i≥1, and detects whether the $i^{th}$ identifier is the identifier of the UE.

The UE reads the $i^{th}$ identifier from the feedback information, where n≥i≥1. In other words, the UE reads information with a fixed length from the feedback information every time, and the information with the fixed length is considered as one identifier. Optionally, the fixed length is 16 bits.

The UE detects whether the $i^{th}$ identifier is the identifier of the UE.

If the $i^{th}$ identifier is the identifier of the UE, go to step 1313. If the $i^{th}$ identifier is not the identifier of the UE, go to step 1314.

Step 1313: If the $i^{th}$ identifier is the identifier of the UE, it indicates that the eNB successfully receives the uplink data.

Step 1314: If the $i^{th}$ identifier is not the identifier of the UE, determine whether i is equal to n; and if i=n, go to step 1315, or if i is not equal to n, set i=i+1, and re-perform the step of reading the $i^{th}$ identifier from the feedback information.

That is, the UE performs step 1312 repeatedly until all the identifiers in the feedback information are read.

Step 1315: If the identifier of the UE is not in the identifiers included in the feedback information, it indicates that the eNB fails in receiving the uplink data, and the uplink data is re-sent.

In conclusion, according to the feedback information sending method provided in this embodiment, the eNB allocates the same uplink shared resource to the m UEs, where m≥2; the eNB receives the uplink data on the uplink shared resource, where the uplink data of each UE includes the identifier of the respective corresponding UE; the eNB generates the feedback information according to the n pieces of the successfully received uplink data, where the feedback information includes the n identifiers, and m≥n≥1; the eNB sends the feedback information by using the MAC PDU; and when the UE does not find the identifier of the corresponding UE in the feedback information, it indicates that the eNB fails in receiving the uplink data, and the uplink data is re-sent by using a different method. This resolves a prior-art problem that an eNB cannot correctly send feedback information to different UEs according to an agreed downlink resource when the multiple UEs send uplink data by using a same uplink shared resource and DM-RS, so that each UE is clear about whether the uplink data of the UE is successfully sent.

It should be noted that the steps related to an eNB side in the aspect of FIG. 13A and FIG. 13B may be independently implemented as a feedback information sending method from a perspective of the eNB side, and the steps related to a UE side may be independently implemented as a feedback information receiving method from a perspective of the UE side.

Generally, the UE has remaining to-be-sent data. In an optional embodiment, the eNB may further deliver an uplink scheduling grant (UL Grant) to the UE in the feedback information. The uplink scheduling grant is used to instruct the UE to send the remaining to-be-sent data in a scheduling based uplink data sending mode. Reference is made to the following embodiment.

Figure 14A:
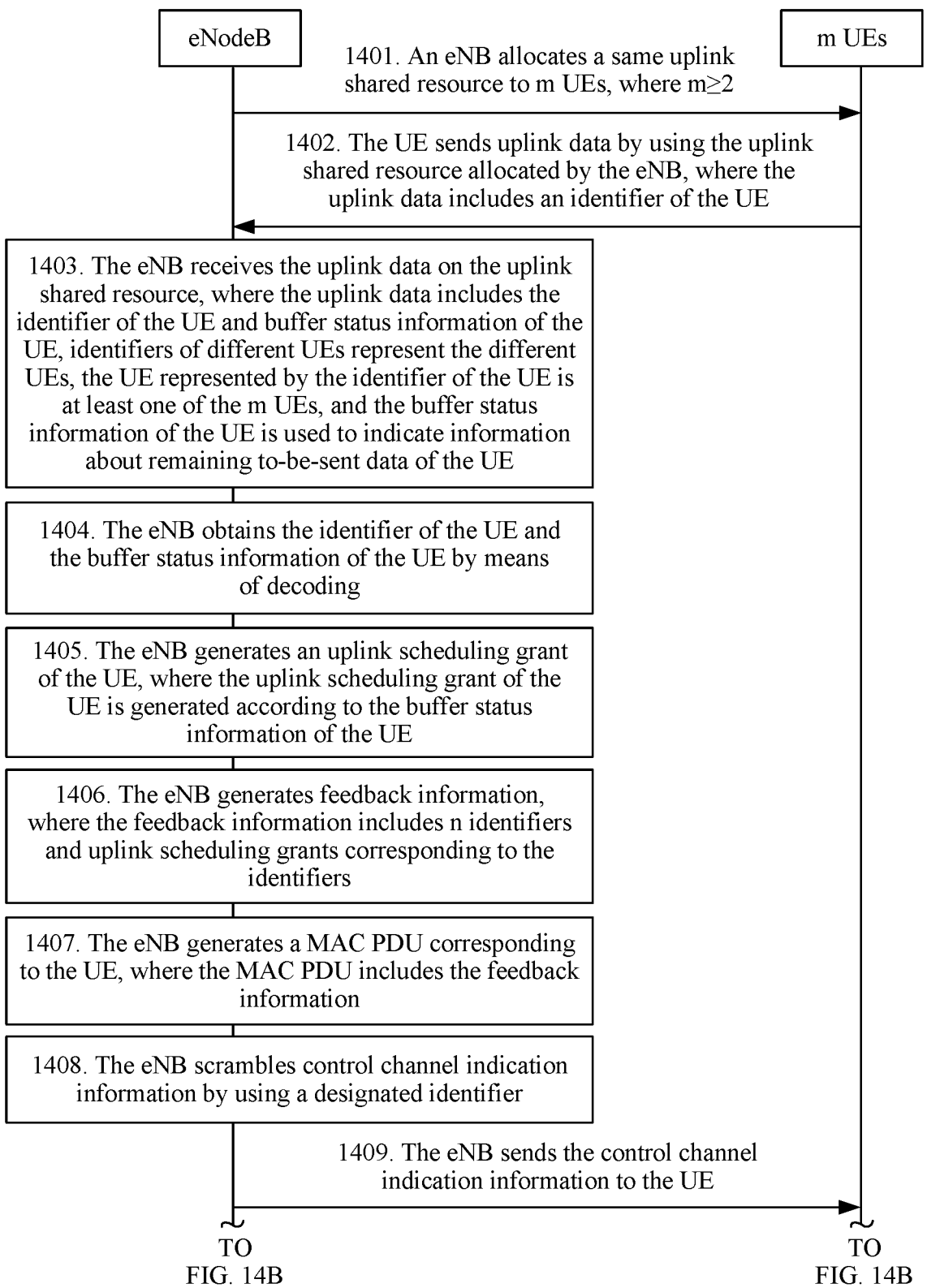
FIG. 14A and FIG. 14B are a flowchart of a feedback information sending method according to another aspect of the present disclosure.
Figure 14B:
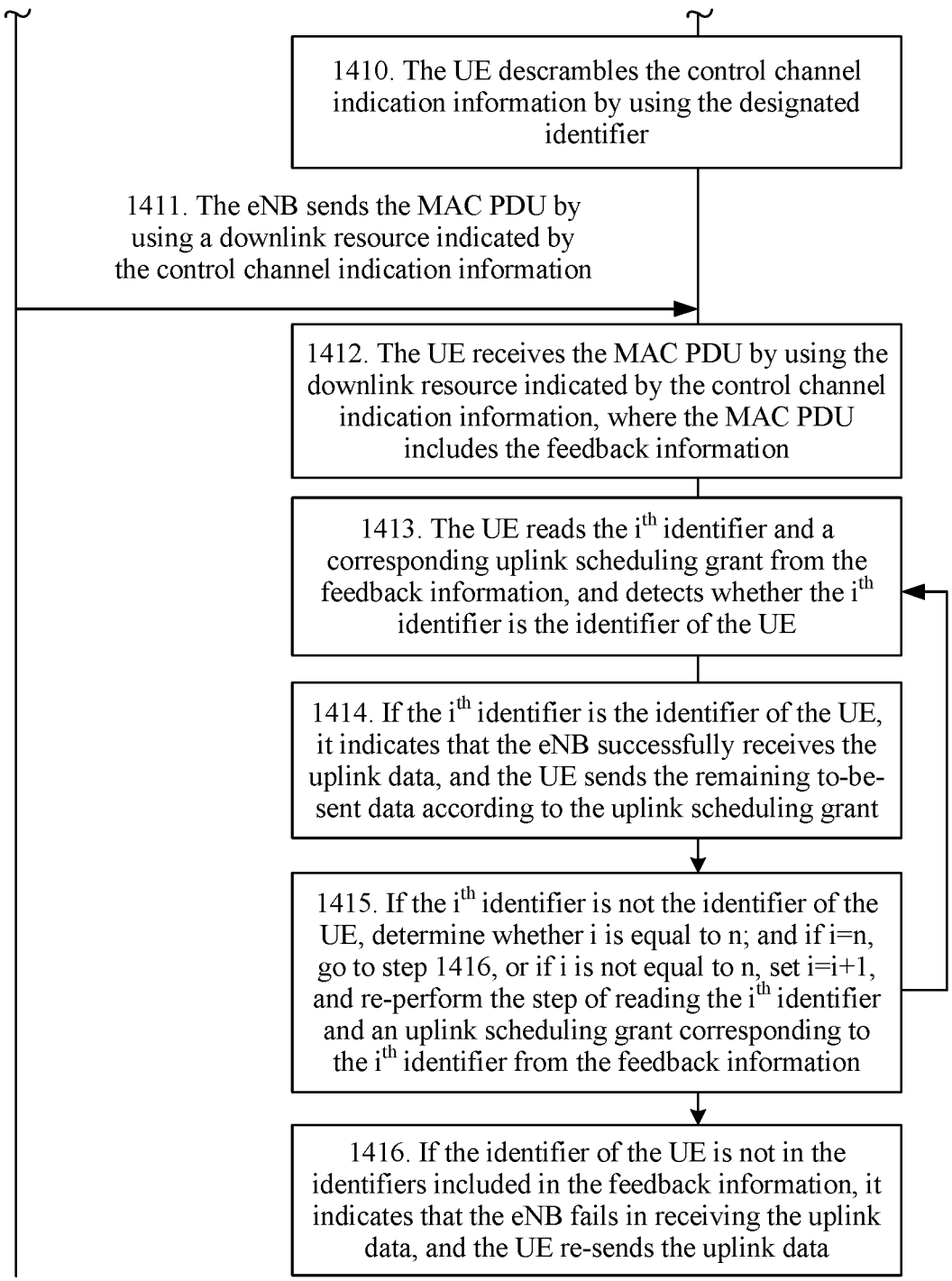

Referring to FIG. 14A and FIG. 14B, FIG. 14A and FIG. 14B show a flowchart of an information feedback method according to another aspect of the present disclosure. The information feedback method includes the following steps.

Step 1401: An eNB allocates a same uplink shared resource to m UEs, where m≥2.

Correspondingly, the UE determines an uplink shared resource of the UE. The uplink shared resource is the same as uplink shared resources of the other m−1 UEs, where m≥2.

Step 1402: The UE sends uplink data by using the uplink shared resource allocated by the eNB, where the uplink data includes an identifier of the UE.

Different from the previous embodiment, uplink data sent by each UE not only includes an identifier of the UE, but also includes buffer status information of the UE. The buffer status information is used to indicate information about remaining to-be-sent data.

For example, the eNB allocates a same uplink shared resource to ten UEs. If six UEs in the ten UEs need to send uplink data simultaneously, and all the six UEs that need to send the uplink data have remaining to-be-sent data, the six UEs that need to send the uplink data send the uplink data to the eNB on the uplink shared resource simultaneously. The uplink data includes an UE identifier, buffer status information of the UE, and data information sent by the UE this time.

Optionally, the buffer status information of the UE includes a volume of remaining to-be-sent data, for example, a 1-bit data volume, or only indicates that there is remaining to-be-sent data in a buffer, but does not indicate a volume of to-be-sent data.

Step 1403: The eNB receives the uplink data on the uplink shared resource, where the uplink data includes the identifier of the UE and buffer status information of the UE, identifiers of different UEs represent the different UEs, the UE represented by the identifier of the UE is at least one of the m UEs, and the buffer status information of the UE is used to indicate information about remaining to-be-sent data of the UE.

The eNB performs channel estimation by using a DM-RS on the uplink shared resource, and obtains, by means of decoding, the uplink data from the uplink shared resource according to a result of the channel estimation. The uplink data includes the identifier of the UE, the buffer status information of the UE, and the data information sent by the UE this time.

Step 1404: The eNB obtains the identifier of the UE and the buffer status information of the UE by means of decoding.

The eNB obtains, by means of decoding according to the successfully received uplink data, the identifier of the UE and the buffer status information of the UE that are included in the uplink data.

Step 1405: The eNB generates an uplink scheduling grant of the UE, where the uplink scheduling grant of the UE is generated according to the buffer status information of the UE.

For each piece of successfully received uplink data, the eNB further generates an uplink scheduling grant, that is, a UL Grant, for the corresponding UE according to the buffer status information included in the uplink data.

The UL Grant includes at least a resource location of an uplink transmission resource allocated to the UE. Optionally, the UL Grant includes a modulation and coding scheme (MCS), a repetition period, and the like. The MCS is used to indicate a specific modulation and coding scheme used by the UE to transmit the uplink data. The repetition period is a period in which the uplink transmission resource allocated by the eNB to the UE appears repeatedly when semi-persistent scheduling is used in this uplink transmission scheduling. The semi-persistent scheduling is a scheduling manner in which the eNB allocates, to the UE at one time, uplink transmission resources that appear periodically.

It should be noted that volumes of information carried in UL Grants corresponding to UEs may be different, but a quantity of bits occupied by each UL Grant may be fixed, for example, each UL Grant occupies 20 bits.

Optionally, the quantity of bits occupied by each UL Grant may be unfixed, for example, each UL Grant occupies 10 bits, 20 bits, or the like. In this embodiment, an example in which each UL Grant occupies 20 bits is used for description. That is, a quantity of bits occupied by each UL Grant is not limited in this embodiment.

Step 1406: The eNB generates feedback information, where the feedback information includes n identifiers and uplink scheduling grants corresponding to the identifiers.

In the feedback information, the identifiers and the UL Grants corresponding to the identifiers are in pairs. Optionally, an identifier is followed by a UL Grant corresponding to the identifier.

Figure 15:
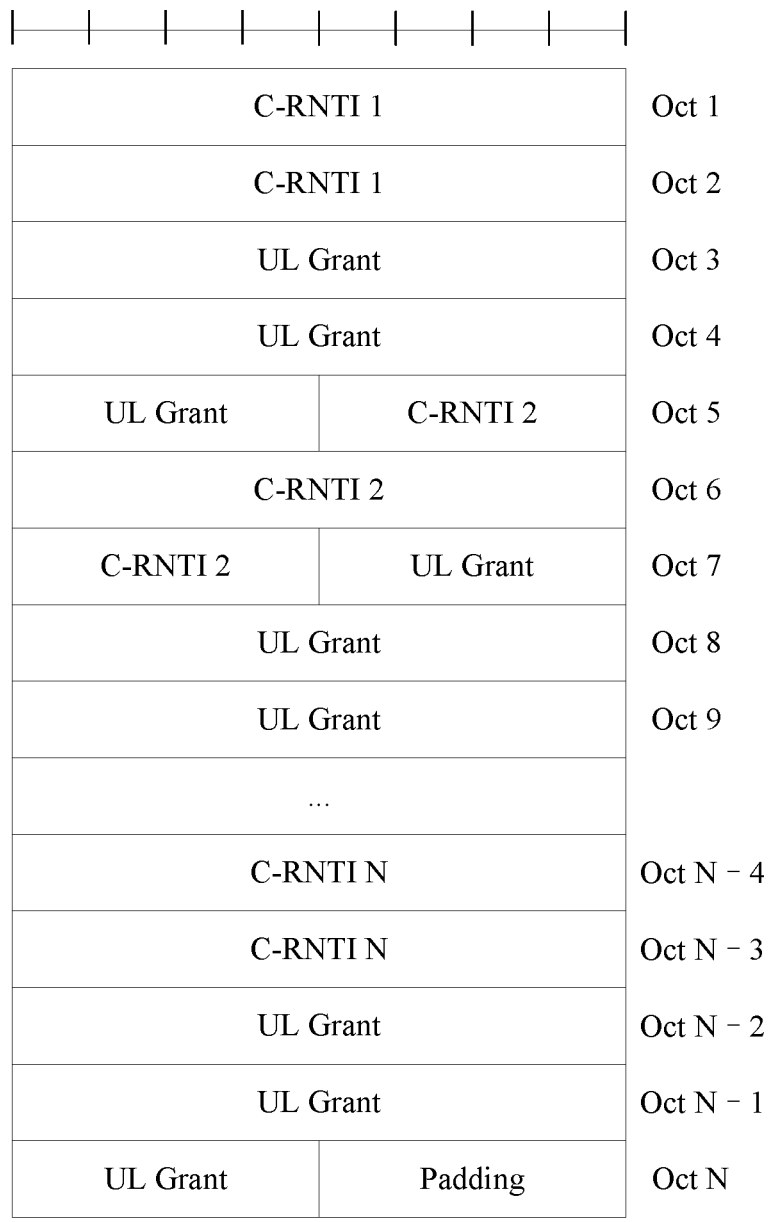
FIG. 15 is a schematic diagram of a feedback information format according to another aspect of the present disclosure.

A schematic diagram of a feedback information format in this embodiment is shown in FIG. 15. FIG. 15 shows feedback information that includes n identifiers and UL Grants corresponding to the identifiers.

If an identifier is represented by a C-RNTI, C-RNTI i represents the $i^{th}$ identifier in the feedback information. Each C-RNTI occupies 16 bits, and each octet Oct is 8 bits. Therefore, each identifier C-RNTI in the feedback information occupies two octets.

Each identifier C-RNTI is followed by a UL Grant corresponding to the identifier, and each UL Grant occupies 20 bits. Padding indicates a padding bit.

Step 1407: The eNB generates a MAC PDU corresponding to the UE, where the MAC PDU includes the feedback information.

The eNB generates, according to n pieces of the successfully received uplink data, the feedback information that includes the n identifiers, and the eNB generates, by using the feedback information that includes the n identifiers, the MAC PDU corresponding to the UE. The MAC PDU includes the feedback information.

Step 1408: The eNB scrambles control channel indication information by using a designated identifier.

The designated identifier is an identifier corresponding to the m UEs, and the control channel indication information is used to indicate a resource location of a downlink resource that carries the MAC PDU.

The designated identifier is the identifier corresponding to the m UEs. In other words, the designated identifier is an identifier shared by the m UEs.

Optionally, the designated identifier is a CB-RNTI or a TTI-RNTI.

The CB-RNTI is an identifier pre-allocated by the eNB in a contention based uplink data transmission mode.

The TTI-RNTI is related to a resource location of the uplink shared resource in step 1402.

Optionally, TTI-RNTI=a+suf_id+b*feq_id, where suf_id is a subframe number corresponding to the uplink shared resource, feq_id is a least significant bit in a physical resource block corresponding to the uplink shared resource, and both a and b are positive integers. For example, a=1, and b=10.

The control channel indication information is used to indicate the resource location of the downlink resource on a PUSCH channel, and the downlink resource indicated by the control channel indication information is used to carry and send the MAC PDU. The eNB first sends the control channel indication information to the UE by using a PDCCH channel. That is, the eNB scrambles the control channel indication information of the MAC PDU by using the designated identifier, and sends the scrambled control channel indication information to the UE by using the PDCCH channel.

Step 1409: The eNB sends the control channel indication information to the UE.

Correspondingly, the UE receives the control channel indication information sent by the eNB.

Step 1410: The UE descrambles the control channel indication information by using the designated identifier.

The designated identifier is the identifier corresponding to the m UEs, and the control channel indication information is used to indicate the resource location of the downlink resource that carries the MAC PDU.

The UE obtains, by means of descrambling on the PDCCH by using the designated identifier, the resource location of the downlink resource indicated by the control channel indication information. Only the UE that has the designated identifier can receive the control channel indication information.

Step 1411: The eNB sends the MAC PDU by using a downlink resource indicated by the control channel indication information.

The eNB sends the MAC PDU by using the downlink resource indicated by the control channel indication information on the PDCCH.

Step 1412: The UE receives the MAC PDU by using the downlink resource indicated by the control channel indication information, where the MAC PDU includes the feedback information.

The UE obtains the feedback information from the MAC PDU by means of decoding. Optionally, the feedback information format is shown in FIG. 15.

Step 1413: The UE reads the $i^{th}$ identifier and a corresponding uplink scheduling grant from the feedback information, and detects whether the $i^{th}$ identifier is the identifier of the UE.

The UE reads, from the feedback information, the $i^{th}$ identifier and the UL Grant corresponding to the $i^{th}$ identifier, where n≥i≥1. In other words, the UE reads information with a fixed length from the feedback information every time, and the information with the fixed length is considered as "one identifier+one UL Grant". Optionally, the fixed length is 16+20=36 bits.

The UE detects whether the $i^{th}$ UE identifier is the identifier of the UE.

If the $i^{th}$ identifier is the identifier of the UE, go to step 1414. If the $i^{th}$ identifier is not the identifier of the UE, go to step 1415.

Step 1414: If the $i^{th}$ identifier is the identifier of the UE, it indicates that the eNB successfully receives the uplink data, and the UE sends the remaining to-be-sent data according to the uplink scheduling grant.

If the $i^{th}$ identifier is the identifier of the UE, the UL Grant corresponding to the $i^{th}$ identifier is a UL Grant corresponding to the UE. The UE sends the remaining to-be-sent data in a buffer to the eNB in a scheduling based uplink data sending mode according to an instruction of the UL Grant.

Step 1415: If the $i^{th}$ identifier is not the identifier of the UE, determine whether i is equal to n; and if i=n, go to step 1416, or if i is not equal to n, set i=i+1, and re-perform the step of reading the $i^{th}$ identifier and an uplink scheduling grant corresponding to the $i^{th}$ identifier from the feedback information.

That is, the UE performs step 1412 repeatedly until all the identifiers and UL Grants in the feedback information are read.

Step 1416: If the identifier of the UE is not in the identifiers included in the feedback information, it indicates that the eNB fails in receiving the uplink data, and the UE re-sends the uplink data.

If a quantity of times of re-sending the uplink data by the UE to the eNB on an uplink shared resource exceeds N, the UE no longer sends the uplink data by using an uplink shared resource, and optionally transmits the uplink data by using a scheduling-based method.

In conclusion, compared with the previous embodiment, according to the feedback information sending method provided in this embodiment, the UE adds the buffer status information to the uplink data sent by the UE; and the eNB generates the corresponding UL Grant according to the buffer status information, adds the corresponding UL Grant to the feedback information, and then delivers the feedback information to the UE, so that the feedback information not only can be used to feed back whether the uplink data is successfully received, but also can be used to schedule uplink data transmission of the UE. Therefore, signaling overheads on the eNB side are reduced, and a speed of uplink data transmission on the UE side is increased.

It should be noted that the steps related to an eNB side in the aspect of FIG. 14A and FIG. 14B may be independently implemented as a feedback information sending method from a perspective of the eNB side, and the steps related to a UE side may be independently implemented as a feedback information receiving method from a perspective of the UE side.

In the aspect of FIG. 14A and FIG. 14B, an example in which uplink data sent by each UE includes "an identifier of the UE+buffer status information of the UE" is used for description. However, in an actual scenario, if UE does not have remaining to-be-sent data, uplink data sent by the UE does not include buffer status information. That is, in uplink data that is sent by UEs and received by an eNB, a part of uplink data may include only an UE identifier, and the other uplink data may include "an UE identifier+buffer status information of the UE". For this case, reference is made to the following embodiment.

Figure 16A:
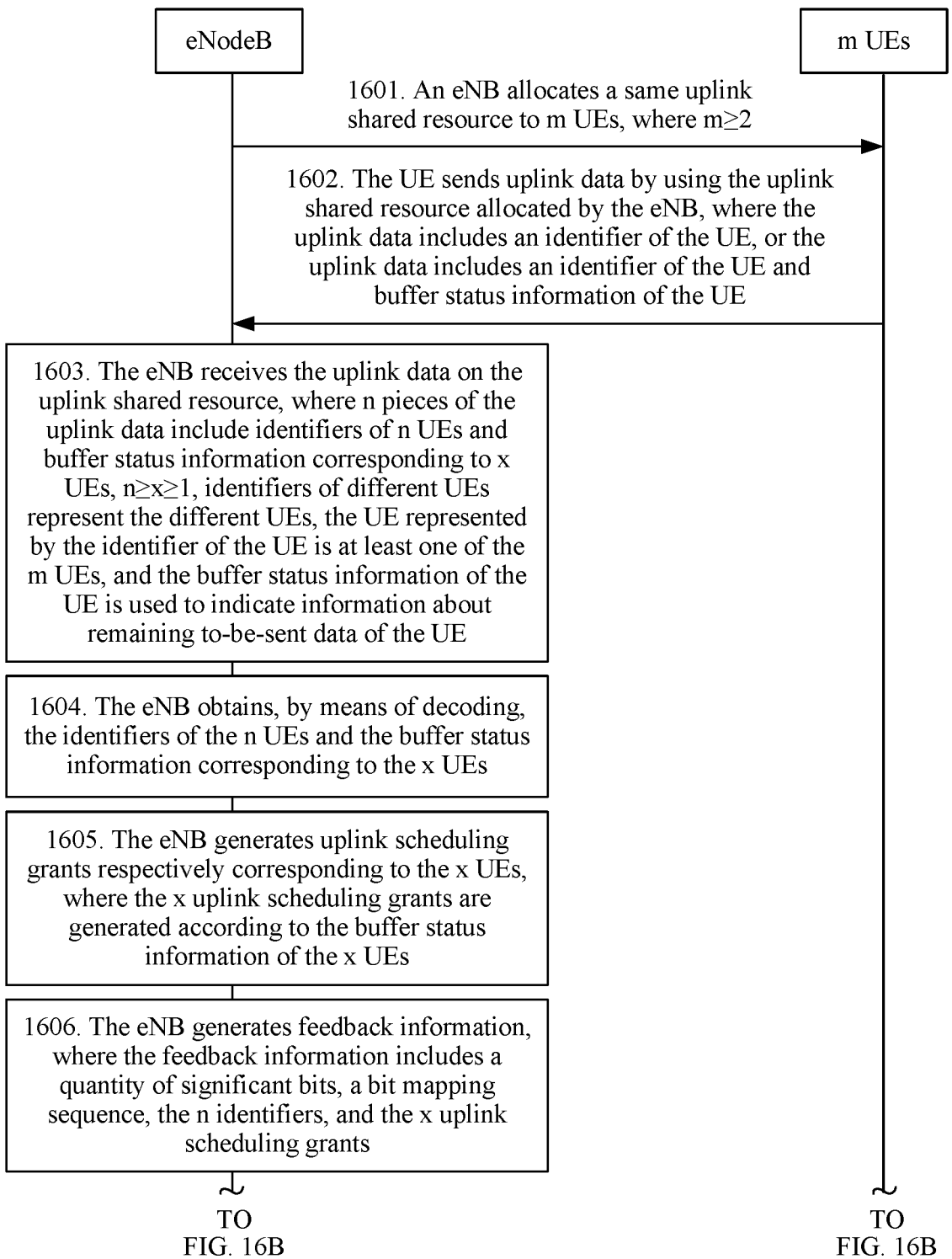
FIG. 16A, FIG. 16B, and FIG. 16C are a flowchart of a feedback information sending method according to another aspect of the present disclosure.
Figure 16B:
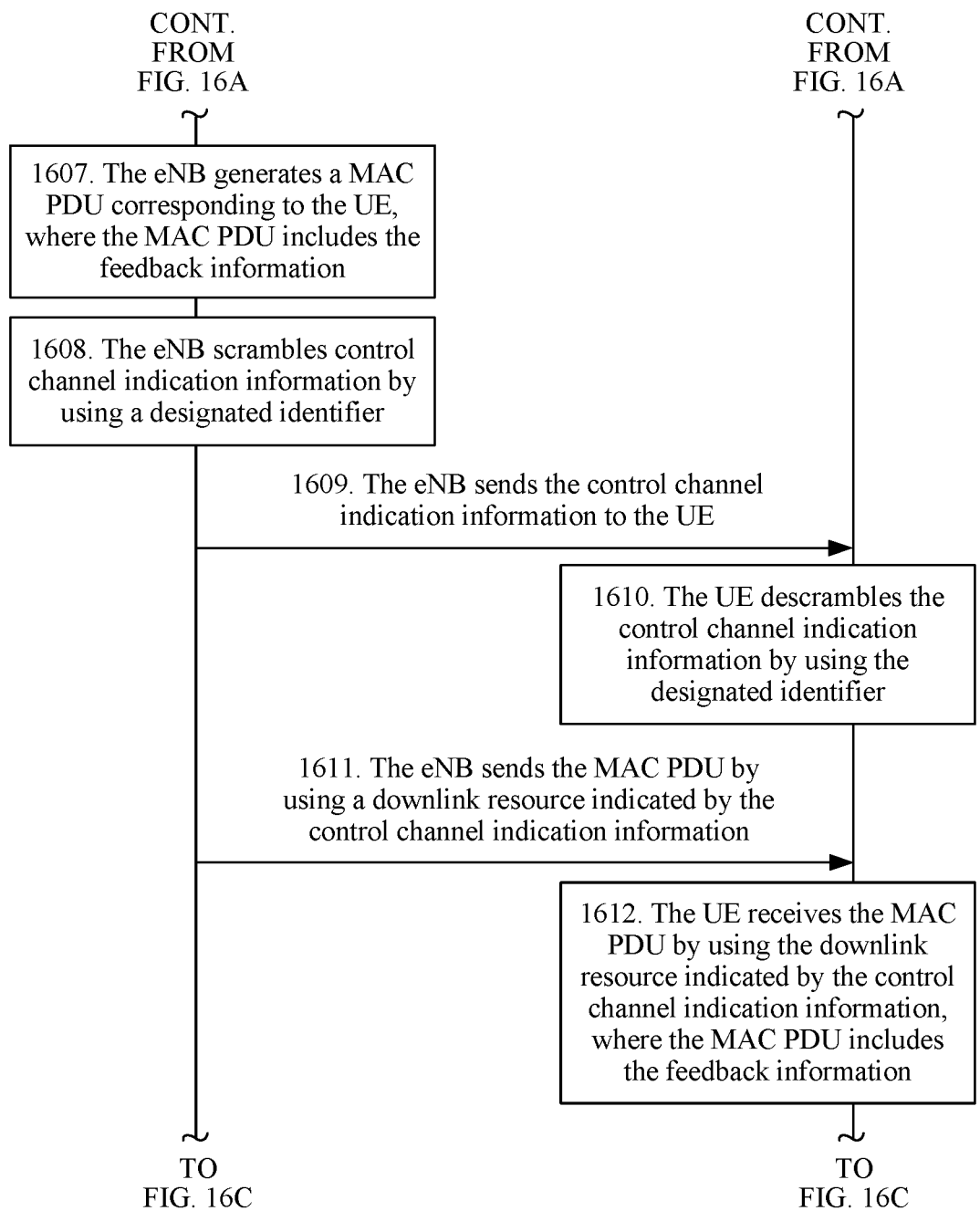
Figure 16C:
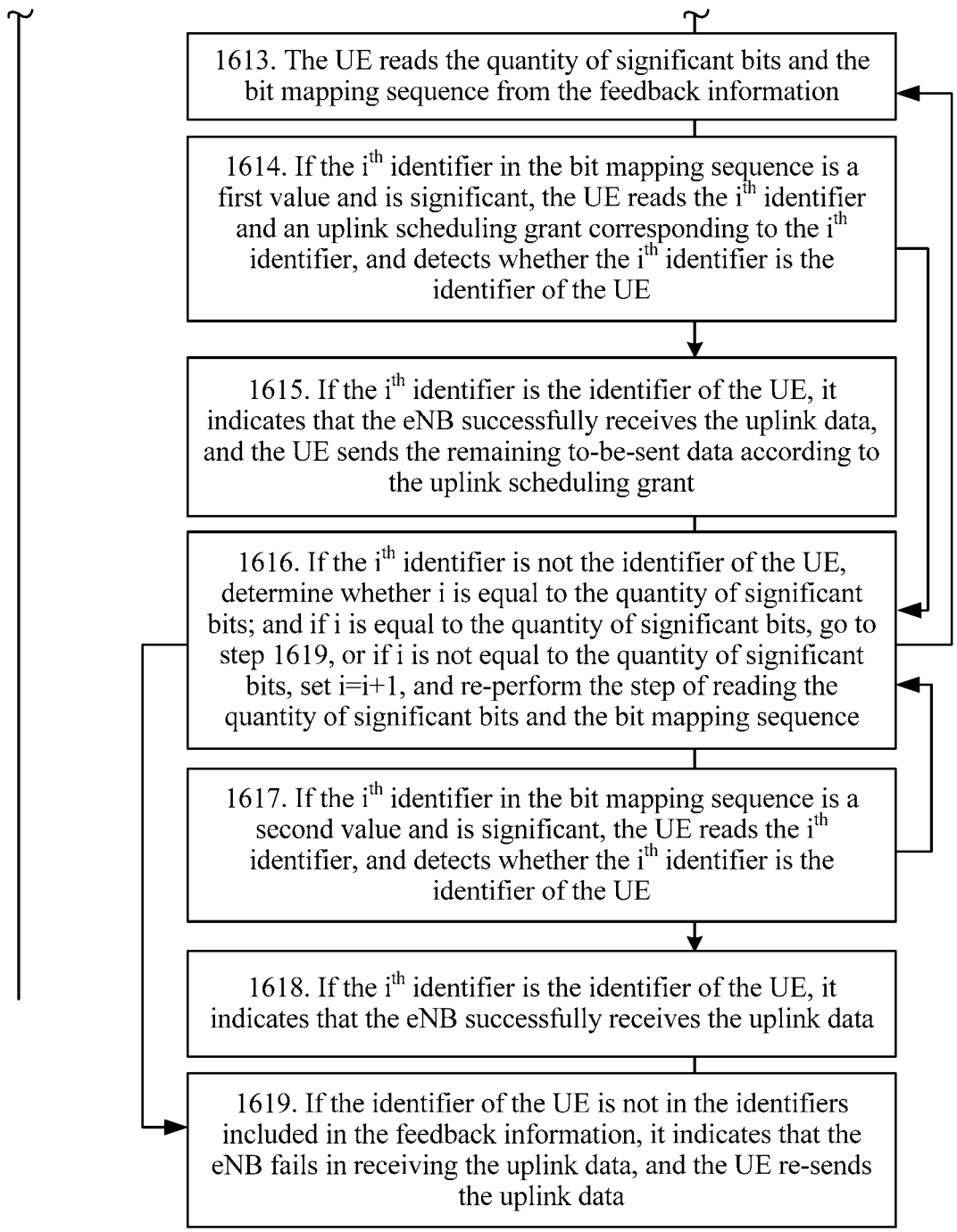

Referring to FIG. 16A, FIG. 16B, and FIG. 16C, FIG. 16A, FIG. 16B, and FIG. 16C show a flowchart of a feedback information sending method according to another aspect of the present disclosure. The feedback information sending method includes the following steps.

Step 1601: An eNB allocates a same uplink shared resource to m UEs, where m≥2.

Correspondingly, the UE determines an uplink shared resource of the UE. The uplink shared resource is the same as uplink shared resources of the other m−1 UEs, where m≥2.

Step 1601 is the same as step 1101, and reference is made to the embodiment shown FIG. 11.

Step 1602: The UE sends uplink data by using the uplink shared resource allocated by the eNB, where the uplink data includes an identifier of the UE, or the uplink data includes an identifier of the UE and buffer status information of the UE.

When there is no remaining to-be-sent data in a buffer of the UE, the uplink data sent by the UE includes the identifier of the UE and data information sent this time.

When there is remaining to-be-sent data in the buffer of the UE, the uplink data sent by the UE includes the identifier of the UE, the buffer status information of the UE, and data information sent this time.

For example, the eNB allocates a same uplink shared resource to ten UEs. If six UEs in the ten UEs need to send uplink data simultaneously, and three UEs in the six UEs have remaining to-be-sent data, the six UEs send the uplink data to the eNB on the uplink shared resource simultaneously. Uplink data sent by three UEs includes an UE identifier and data information sent by the UE this time. Uplink data sent by the other three UEs includes an UE identifier, buffer status information of the UE, and data information sent by the UE this time.

Step 1603: The eNB receives the uplink data on the uplink shared resource, where n pieces of the uplink data include identifiers of n UEs and buffer status information corresponding to x UEs, n≥x≥1, identifiers of different UEs represent the different UEs, the UE represented by the identifier of the UE is at least one of the m UEs, and the buffer status information of the UE is used to indicate information about remaining to-be-sent data of the UE.

The eNB performs channel estimation by using a DM-RS on the uplink shared resource, and obtains, by means of decoding, the uplink data of the UE from the uplink shared resource according to a result of the channel estimation.

Step 1604: The eNB obtains, by means of decoding, the identifiers of the n UEs and the buffer status information corresponding to the x UEs.

One piece of uplink data includes an UE identifier, buffer status information of the UE, and data information sent by the UE this time, or one piece of uplink data includes an UE identifier and data information sent by the UE this time.

Because uplink data sent by some UEs do not include buffer status information, the n pieces of the uplink data successfully received by the eNB include the identifiers of the n UEs and the buffer status information corresponding to the x UEs.

Step 1605: The eNB generates uplink scheduling grants corresponding to the x UEs, where the x uplink scheduling grants are generated according to the buffer status information of the x UEs.

For uplink data of the UE that includes buffer status information, the eNB further generates an uplink scheduling grant, that is, a UL Grant, for the corresponding UE according to the buffer status information included in the uplink data.

The UL Grant includes at least a resource location of an uplink transmission resource allocated to the UE. Optionally, the UL Grant includes an MCS, a repetition period, and the like. The MCS is used to indicate a specific modulation and coding scheme used by the UE to transmit the uplink data. The repetition period is a period in which the uplink transmission resource allocated by the eNB to the UE appears repeatedly when semi-persistent scheduling is used in this uplink transmission scheduling. The semi-persistent scheduling is a scheduling manner in which the eNB allocates, to the UE at one time, uplink transmission resources that appear periodically.

It should be noted that volumes of information carried in UL Grants corresponding to UEs may be different. Therefore, a quantity of bits occupied by each UL Grant may be fixed or may be unfixed. In this embodiment, an example in which each UL Grant occupies 20 bits is used for description.

Step 1606: The eNB generates feedback information, where the feedback information includes a quantity of significant bits, a bit mapping sequence, the n identifiers, and the x uplink scheduling grants.

The quantity of significant bits is a quantity of significant bits in the bit mapping sequence, and the bit mapping sequence is a bit sequence with a fixed bit quantity. A value in the bit mapping sequence includes a first value and a second value. The first value is 0 and the second value is 1, or the first value is 1 and the second value is 0.

When the $i^{th}$ bit in the bit mapping sequence is the first value and is significant, it indicates that the $i^{th}$ identifier in the feedback information is followed by a corresponding uplink scheduling grant with a fixed bit quantity.

When the $i^{th}$ bit in the bit mapping sequence is the second value and is significant, it indicates that the $i^{th}$ identifier in the feedback information is not followed by a corresponding uplink scheduling grant with a fixed bit quantity.

Figure 17:
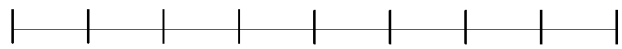
FIG. 17 is a schematic diagram of a feedback information format according to another aspect of the present disclosure.

A schematic diagram of a feedback information format in this embodiment is shown in FIG. 17.

R is a format representation bit, occupies one bit, and is used to indicate a reserved bit.

UE Number is a quantity of significant bits. Optionally, UE Number occupies three bits, and is used to identify a quantity of significant bits from left to right in a bit mapping sequence ACK or Grant. In this embodiment, that UE Number occupies three bits is merely used as an example for description. A quantity of bits occupied by UE Number is not limited in this embodiment.

The bit mapping sequence ACK or Grant always occupies eight bits, but the eight bits are not always significant. This is related to whether the $i^{th}$ identifier in the feedback information is followed by a corresponding UL Grant.

When the $i^{th}$ bit in the bit mapping sequence ACK or Grant is 1 and is significant, it indicates that the $i^{th}$ identifier in the feedback information is followed by a corresponding UL Grant with a fixed bit quantity (20 bits).

When the $i^{th}$ bit in the bit mapping sequence ACK or Grant is 0 and is significant, it indicates that the $i^{th}$ identifier in the feedback information is not followed by a corresponding UL Grant with a fixed bit quantity. That is, only one piece of ACK information exists, and the UL Grant is not included.

Optionally, if an identifier is represented by a C-RNTI, C-RNTI i represents the $i^{th}$ identifier in the feedback information. Each C-RNTI occupies 16 bits, and each octet Oct is 8 bits. Therefore, each identifier C-RNTI in the feedback information occupies two octets.

Step 1607: The eNB generates a MAC PDU corresponding to the UE, where the MAC PDU includes the feedback information.

The eNB generates, according to the n pieces of the successfully received uplink data, the feedback information that includes the n identifiers and the UL Grants corresponding to the x UEs, and the eNB generates the corresponding MAC PDU by using the feedback information that includes the n identifiers. The MAC PDU includes the feedback information.

Step 1608: The eNB scrambles control channel indication information by using a designated identifier.

The designated identifier is an identifier corresponding to the m UEs, and the control channel indication information is used to indicate a resource location of a downlink resource that carries the MAC PDU.

The designated identifier is the identifier corresponding to the m UEs. In other words, the designated identifier is an identifier shared by the m UEs.

Optionally, the designated identifier is a CB-RNTI or a TTI-RNTI.

The CB-RNTI is an identifier pre-allocated by the eNB in a contention based uplink data transmission mode.

The TTI-RNTI is related to a resource location of the uplink shared resource in step 1602.

Optionally, TTI-RNTI=a+suf_id+b*feq_id, where suf_id is a subframe number corresponding to the uplink shared resource, feq_id is a least significant bit in a physical resource block corresponding to the uplink shared resource, and both a and b are positive integers. For example, a=1, and b=10.

The control channel indication information is used to indicate the resource location of the downlink resource on a PUSCH channel, and the downlink resource indicated by the control channel indication information is used to carry and send the MAC PDU. The eNB first sends the control channel indication information by using a PDCCH channel. That is, the eNB scrambles the control channel indication information of the MAC PDU by using the designated identifier, and sends the scrambled control channel indication information to the UE by using the PDCCH channel.

Step 1609: The eNB sends the control channel indication information to the UE.

Correspondingly, the UE receives the control channel indication information sent by the eNB.

Step 1610: The UE descrambles the control channel indication information by using the designated identifier.

The designated identifier is the identifier corresponding to the m UEs, and the control channel indication information is used to indicate the resource location of the downlink resource that carries the MAC PDU.

The UE obtains, by means of descrambling on the PDCCH channel by using the designated identifier, the resource location of the downlink resource indicated by the control channel indication information. Only the UE that has the designated identifier can receive the control channel indication information.

Step 1611: The eNB sends the MAC PDU by using a downlink resource indicated by the control channel indication information.

The eNB sends the MAC PDU by using the downlink resource indicated by the control channel indication information on the PDCCH.

Step 1612: The UE receives the MAC PDU by using the downlink resource indicated by the control channel indication information, where the MAC PDU includes the feedback information.

The UE obtains the feedback information from the MAC PDU by means of decoding. Optionally, the feedback information format is shown in FIG. 17.

Step 1613: The UE reads the quantity of significant bits and the bit mapping sequence from the feedback information.

The quantity of significant bits is used to indicate the quantity of significant bits in the bit mapping sequence, and the bit mapping sequence is the bit sequence with the fixed bit quantity.

Step 1614: If the $i^{th}$ identifier in the bit mapping sequence is a first value and is significant, the UE reads the $i^{th}$ identifier and an uplink scheduling grant corresponding to the $i^{th}$ identifier, and detects whether the $i^{th}$ identifier is the identifier of the UE.

The UE reads, from the feedback information, the $i^{th}$ identifier and the UL Grant corresponding to the $i^{th}$ identifier, where x≥i≥1. In other words, the UE reads information with a fixed length from the feedback information every time, and the information with the fixed length is considered as "one identifier+one UL Grant". Optionally, the fixed length is 16+20=36 bits.

The UE detects whether the $i^{th}$ identifier is the identifier of the UE.

If the $i^{th}$ identifier is the identifier of the UE, go to step 1615. If the $i^{th}$ identifier is not the identifier of the UE, go to step 1616.

Step 1615: If the $i^{th}$ identifier is the identifier of the UE, it indicates that the eNB successfully receives the uplink data, and the UE sends the remaining to-be-sent data according to the uplink scheduling grant.

If the $i^{th}$ identifier is the identifier of the UE, the UL Grant corresponding to the $i^{th}$ identifier is a UL Grant corresponding to the UE. The UE sends the remaining to-be-sent data in a buffer to the eNB in a scheduling based uplink data sending mode according to an instruction of the UL Grant.

Step 1616: If the $i^{th}$ identifier is not the identifier of the UE, determine whether i is equal to the quantity of significant bits; and if i is equal to the quantity of significant bits, go to step 1619, or if i is not equal to the quantity of significant bits, set i=i+1, and re-perform the step of reading the quantity of significant bits and the bit mapping sequence.

That is, the UE performs step 1613 repeatedly until all the identifiers of the UEs in the feedback information are read.

Step 1617: If the $i^{th}$ identifier in the bit mapping sequence is a second value and is significant, the UE reads the $i^{th}$ identifier, and detects whether the $i^{th}$ identifier is the identifier of the UE.

The UE reads the $i^{th}$ identifier from the feedback information, where n≥i≥1. In other words, the UE reads information with a fixed length from the feedback information, and the information with the fixed length is considered as "one identifier". Optionally, the fixed length is 16 bits.

The UE detects whether the $i^{th}$ identifier is the identifier of the UE.

If the $i^{th}$ identifier is the identifier of the UE, go to step 1618. If the $i^{th}$ identifier is not the identifier of the UE, go to step 1616.

Step 1618: If the $i^{th}$ identifier is the identifier of the UE, it indicates that the eNB successfully receives the uplink data.

Step 1619: If the identifier of the UE is not in the identifiers included in the feedback information, it indicates that the eNB fails in receiving the uplink data, and the UE re-sends the uplink data.

In conclusion, compared with the previous embodiment, according to the feedback information sending method provided in this embodiment, some of the UEs add the buffer status information to the uplink data; and the eNB generates, according to the buffer status information, the UL Grants corresponding to the UEs, adds the UL Grants to the feedback information, and then delivers the feedback information to the corresponding UEs, so that the feedback information can be used to schedule uplink data transmission of the UEs.

It should be noted that the steps related to an eNB side in the aspect of FIG. 16A, FIG. 16B, and FIG. 16C may be independently implemented as a feedback information sending method from a perspective of the eNB side, and the steps related to a UE side may be independently implemented as a feedback information receiving method from a perspective of the UE side.

In the aspect of FIG. 16A, FIG. 16B, and FIG. 16C, an example in which uplink data sent by some UEs includes "an identifier of the UE+buffer status information of the UE" is used for description, and current available uplink resources can meet requirements of resources that are indicated by uplink scheduling grants and that are required by the UEs. However, in an actual scenario, if a volume of remaining to-be-sent data is excessively large, a quantity of current available uplink resources of an eNB may be less than a quantity of uplink resources required in this scheduling. That is, the quantity of the available uplink resources on the eNB side may be insufficient. For this case, reference is made to the following embodiment.

Figure 18A:
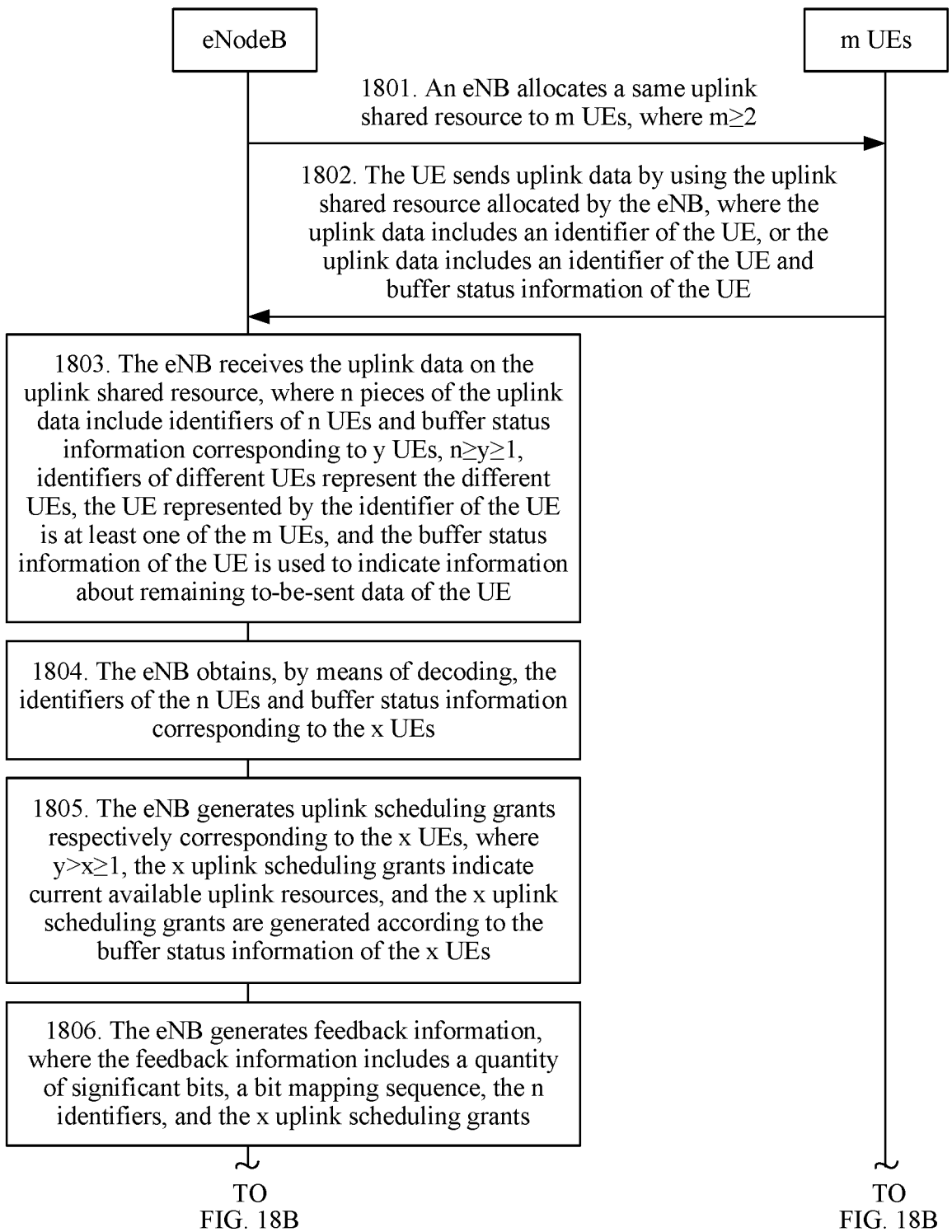
FIG. 18A, FIG. 18B, and FIG. 18C are a flowchart of a feedback information sending method according to another aspect of the present disclosure.
Figure 18B:
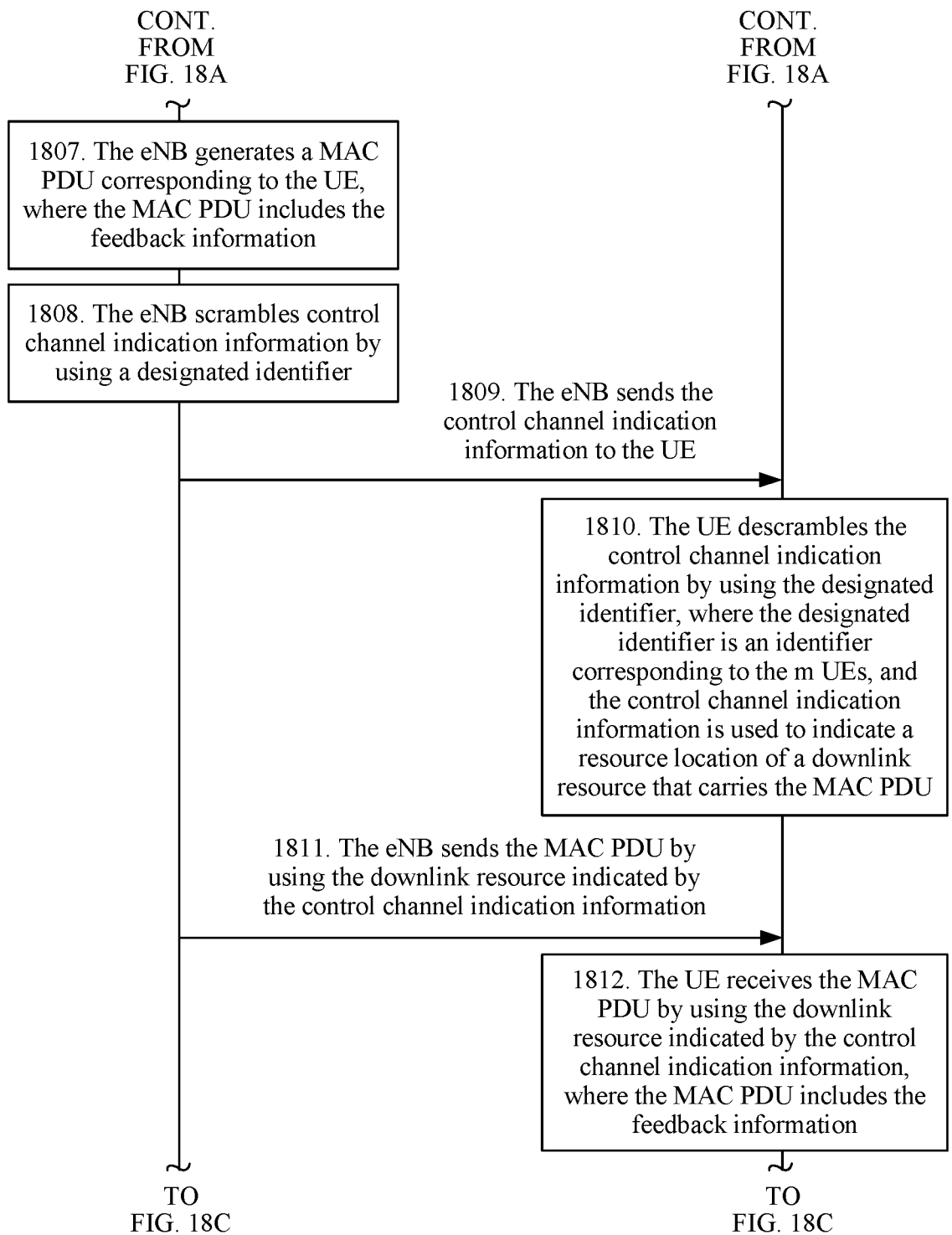
Figure 18C:
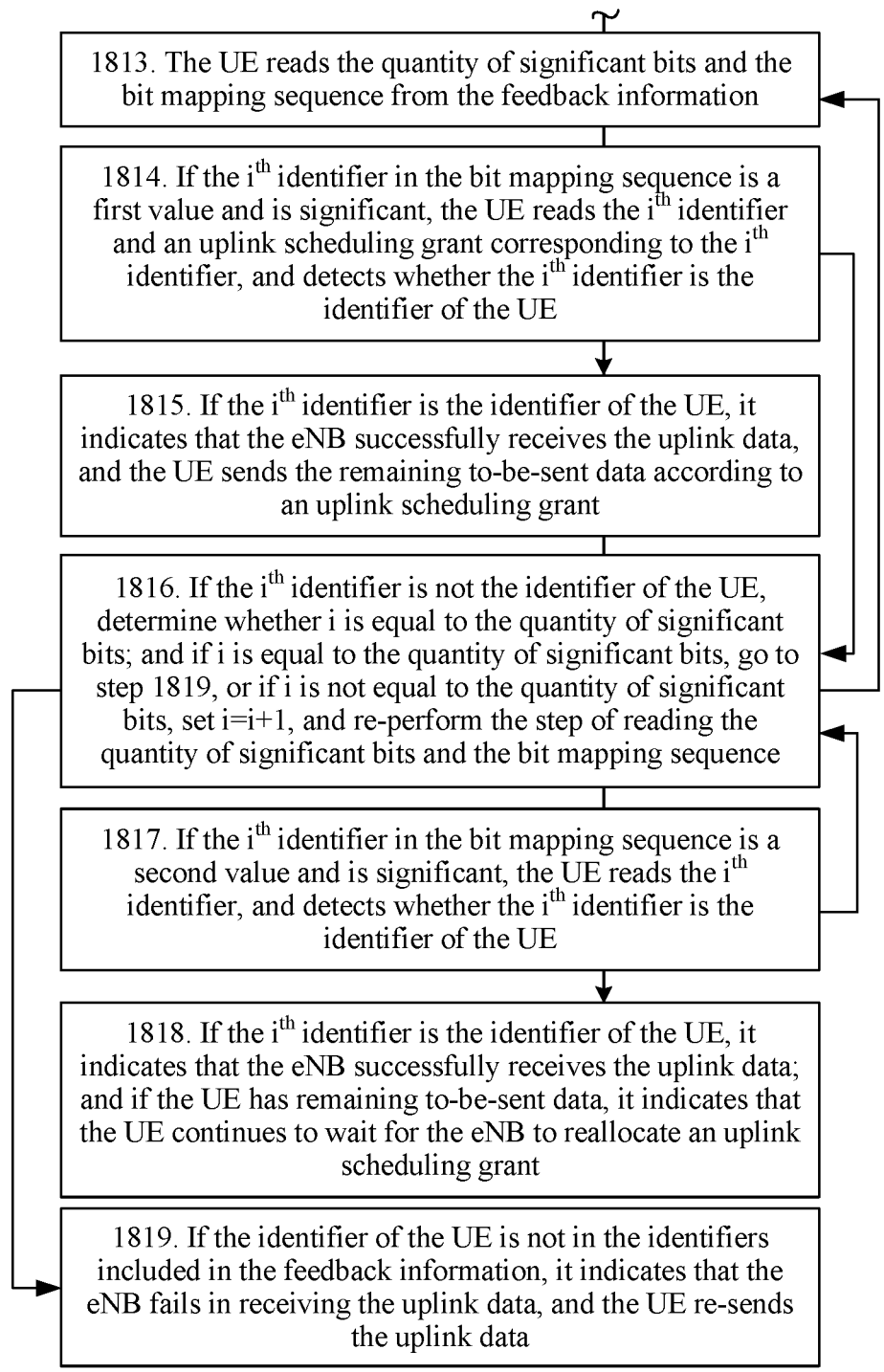

Referring to FIG. 18A, FIG. 18B, and FIG. 18C, FIG. 18A, FIG. 18B, and FIG. 18C show a flowchart of a feedback information sending method according to another aspect of the present disclosure. The feedback information sending method includes the following steps.

Step 1801: An eNB allocates a same uplink shared resource to m UEs, where m≥2.

Correspondingly, the UE determines an uplink shared resource of the UE. The uplink shared resource is the same as uplink shared resources of the other m−1 UEs, where m≥2.

Step 1802: The UE sends uplink data by using the uplink shared resource allocated by the eNB, where the uplink data includes an identifier of the UE, or the uplink data includes an identifier of the UE and buffer status information of the UE.

Step 1803: The eNB receives the uplink data on the uplink shared resource, where n pieces of the uplink data include identifiers of n UEs and buffer status information corresponding to y UEs, n≥y≥1, identifiers of different UEs represent the different UEs, the UE represented by the identifier of the UE is at least one of the m UEs, and the buffer status information of the UE is used to indicate information about remaining to-be-sent data of the UE.

Step 1804: The eNB obtains, by means of decoding, the identifiers of the n UEs and the buffer status information corresponding to the y UEs.

Step 1801 to step 1804 are the same as step 1601 to step 1604, and reference is made to the embodiment shown in FIG. 16A, FIG. 16B, and FIG. 16C.

Step 1805: The eNB generates uplink scheduling grants respectively corresponding to x UEs, where y>x≥1, the x uplink scheduling grants indicate current available uplink resources, and the x uplink scheduling grants are generated according to buffer status information of the x UEs.

For example, the eNB allocates a same uplink shared resource to ten UEs, and eight UEs simultaneously send uplink data to the eNB by using the uplink shared resource. Uplink data sent by six UEs includes an UE identifier, buffer status information of the UE, and data information sent by the UE this time, and uplink data sent by two UEs includes only an UE identifier and data information sent by the UE this time. However, current available uplink resources of the eNB can be used only by four UEs that send buffer status information. Therefore, the eNB generates, according to the current available uplink resources and the buffer status information, UL Grants corresponding to the four UEs The UL Grant includes at least an uplink transmission resource allocated to the UE. Optionally, the UL Grant includes an MCS, a repetition period, and the like. The MCS is used to indicate a specific modulation and coding scheme used by the UE to transmit the uplink data. The repetition period is a period in which the uplink transmission resource allocated by the eNB to the UE appears repeatedly when semi-persistent scheduling is used in this uplink transmission scheduling. The semi-persistent scheduling is a scheduling manner in which the eNB allocates, to the UE at one time, uplink transmission resources that appear periodically.

It should be noted that volumes of information carried in UL Grants corresponding to UEs may be different, but a quantity of bits occupied by each UL Grant is fixed. Optionally, each UL Grant occupies 20 bits.

Step 1806: The eNB generates feedback information, where the feedback information includes a quantity of significant bits, a bit mapping sequence, the n identifiers, and the x uplink scheduling grants.

When the $i^{th}$ bit in the bit mapping sequence is a first value and is significant, it indicates that the $i^{th}$ identifier in the feedback information is followed by a corresponding uplink scheduling grant with a fixed bit quantity.

When the $i^{th}$ bit in the bit mapping sequence is a second value and is significant, it indicates that the $i^{th}$ identifier in the feedback information is not followed by a corresponding uplink scheduling grant with a fixed bit quantity.

Step 1807: The eNB generates a MAC PDU corresponding to the UE, where the MAC PDU includes the feedback information.

Step 1808: The eNB scrambles control channel indication information by using a designated identifier.

The designated identifier is an identifier corresponding to the m UEs, and the control channel indication information is used to indicate a resource location of a downlink resource that carries the MAC PDU.

Step 1809: The eNB sends the control channel indication information to the UE.

Correspondingly, the UE receives the control channel indication information sent by the eNB.

Step 1810: The UE descrambles the control channel indication information by using the designated identifier, where the designated identifier is an identifier corresponding to the m UEs, and the control channel indication information is used to indicate a resource location of a downlink resource that carries the MAC PDU.

Step 1811: The eNB sends the MAC PDU by using the downlink resource indicated by the control channel indication information.

Step 1812: The UE receives the MAC PDU by using the downlink resource indicated by the control channel indication information, where the MAC PDU includes the feedback information.

Step 1813: The UE reads the quantity of significant bits and the bit mapping sequence from the feedback information.

The quantity of significant bits is used to indicate a quantity of significant bits in the bit mapping sequence, and the bit mapping sequence is a bit sequence with a fixed bit quantity.

Step 1814: If the $i^{th}$ identifier in the bit mapping sequence is a first value and is significant, the UE reads the $i^{th}$ identifier and an uplink scheduling grant corresponding to the $i^{th}$ identifier, and detects whether the $i^{th}$ identifier is the identifier of the UE.

The UE detects whether the $i^{th}$ identifier is the identifier of the UE.

If the $i^{th}$ identifier is the identifier of the UE, go to step 1815. If the $i^{th}$ identifier is not the identifier of the UE, go to step 1817.

Step 1815: If the $i^{th}$ identifier is the identifier of the UE, it indicates that the eNB successfully receives the uplink data, and the UE sends the remaining to-be-sent data according to the uplink scheduling grant.

Step 1816: If the $i^{th}$ identifier is not the identifier of the UE, determine whether i is equal to the quantity of significant bits; and if i is equal to the quantity of significant bits, go to step 1819, or if i is not equal to the quantity of significant bits, set i=i+1, and re-perform the step of reading the quantity of significant bits and the bit mapping sequence.

That is, the UE performs step 1813 repeatedly until all the identifiers in the feedback information are read.

Step 1817: If the $i^{th}$ identifier in the bit mapping sequence is a second value and is significant, the UE reads the $i^{th}$ identifier, and detects whether the $i^{th}$ identifier is the identifier of the UE.

The UE detects whether the $i^{th}$ identifier is the identifier of the UE.

If the $i^{th}$ identifier is the identifier of the UE, go to step 1818. If the $i^{th}$ identifier is not the identifier of the UE, go to step 1817.

Step 1806 to step 1817 are the same as step 1606 to step 1617, and reference is made to the embodiment shown in FIG. 16A, FIG. 16B, and FIG. 16C.

Step 1818: If the $i^{th}$ identifier is the identifier of the UE, it indicates that the eNB successfully receives the uplink data; and if the UE has the remaining to-be-sent data, the UE continues to wait for the eNB to reallocate an uplink scheduling grant.

Step 1819: If the identifier of the UE is not in the identifiers included in the feedback information, it indicates that the eNB fails in receiving the uplink data, and the UE re-sends the uplink data.

In conclusion, compared with the previous embodiment, according to the feedback information sending method provided in this embodiment, UL Grants corresponding to some UEs are generated for the UEs according to the current available uplink resources and the buffer status information, the UL Grants are added to the feedback information, and then the feedback information is sent to the corresponding UEs. For another UE to which no UL Grant is allocated, an identifier corresponding to the UE is sent first, so that the UE waits for the eNB to reallocate a UL Grant.

It should be noted that the steps related to an eNB side in the aspect of FIG. 18A, FIG. 18B, and FIG. 18C may be independently implemented as a feedback information sending method from a perspective of the eNB side, and the steps related to a UE side may be independently implemented as a feedback information receiving method from a perspective of the UE side.

In all the foregoing embodiments, an eNB sends feedback information by using a MAC PDU. In an actual scenario, an eNB may alternatively send generated feedback information to UE in another manner. For details, reference is made to the following embodiment.

Figure 19:
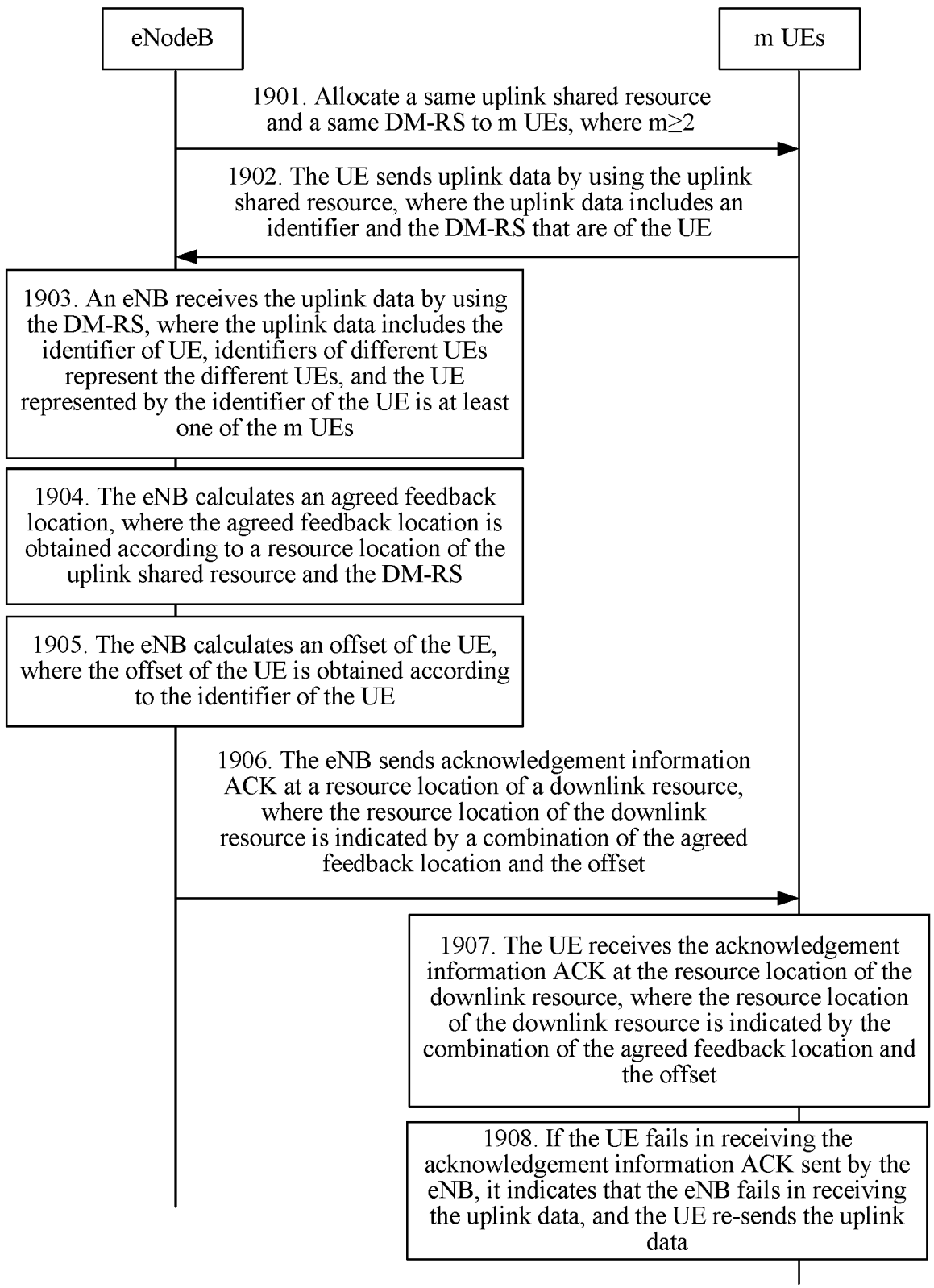
FIG. 19 is a flowchart of a feedback information sending method according to another aspect of the present disclosure.

Referring to FIG. 19, FIG. 19 shows a flowchart of a feedback information sending method according to another aspect of the present disclosure. The feedback information sending method includes the following steps.

Step 1901: Allocate a same uplink shared resource and a same DM-RS to m UEs, where m≥2.

In LTE, an uplink shared resource is a time-frequency resource on a PUSCH channel, and multiple UEs may share a same uplink shared resource to transmit data.

The DM-RS is used to perform, on the PUSCH channel, channel estimation for data transmitted by the UE.

Correspondingly, the UE determines an uplink shared resource and a DM-RS that are of the UE. Specifically, the UE receives the DM-RS and configuration information related to the uplink shared resource, where the DM-RS and the configuration information are sent by an eNB; and determines the uplink shared resource and the DM-RS that are of the UE according to the received configuration information and DM-RS.

In other embodiments, if the eNB and the UE agree in advance on a configuration manner of an uplink shared resource, the UE may determine the uplink shared resource by itself according to the configuration manner agreed in advance.

Step 1902: The UE sends uplink data by using the uplink shared resource, where the uplink data includes an identifier and the DM-RS that are of the UE.

For example, the eNB allocates a same uplink shared resource to ten UEs. If three UEs in the ten UEs need to send uplink data simultaneously, the three UEs that need to send the uplink data send the respective uplink data to the eNB on the same uplink shared resource. The uplink data includes an identifier and a DM-RS that are of the corresponding UE. That is, each piece of uplink data includes an identifier and a DM-RS that are of UE, and data information sent by the UE.

Correspondingly, the eNB receives uplink data, sent by the UE, that includes the identifier and the DM-RS of the UE.

Step 1903: An eNB receives the uplink data by using the DM-RS, where the uplink data includes the identifier of the UE, identifiers of different UEs represent the different UEs, and the UE represented by the identifier of the UE is at least one of the m UEs.

The eNB performs channel estimation by using the DM-RS on the uplink shared resource, and obtains, by means of decoding, the uplink data from the uplink shared resource according to a result of the channel estimation. The uplink data includes the identifier and the DM-RS that are of the UE.

Step 1904: The eNB calculates an agreed feedback location, where the agreed feedback location is obtained according to a resource location of the uplink shared resource and the DM-RS.

In LTE, an agreed feedback location is a resource location that is of a time-frequency resource on a PHICH channel and that is obtained by an eNB by means of calculation according to a resource location of a time-frequency resource on a PUSCH channel and a DM-RS. Specific calculation formulas are as follows:

$n_{PHICH}^{group} = (I_{PRB\_RA} + n_{DMRS}) \bmod N_{PHICH}^{group} + I_{PHICH} N_{PHICH}^{group} + f(C\text{-RNTI})$, and $$n_{PHICH}^{seq} = (\lfloor I_{PRB\_RA}/N_{PHICH}^{group} \rfloor + n_{DMRS}) \bmod 2N_{SF}^{PHICH} + f(C\text{-RNTI}), \text{ where}$$

$n_{PHICH}^{group}$ is used to identify a group number of a group to which a downlink resource belongs on the PHICH; $n_{PHICH}^{seq}$ is used to identify an orthogonal sequence number of the downlink resource in the group on the PHICH; $n_{DMRS}$ is used to identify a DM-RS sequence that is last indicated by the PDCCH to the UE; $N_{PHICH}^{group}$ is used to identify a quantity of groups on the PHICH; and $N_{SF}^{PHICH}$ is a spreading factor used for modulating the PHICH, where $$I_{PHICH} = \begin{cases} 1 & \text{When an uplink-downlink configuration in a } TDD \text{ mode is 0 and the uplink data is sent in a subframe 4 or subframe 9 on a physical uplink shared channel } PUSCH \\ 0 & \text{Otherwise} \end{cases}$$

and $$I_{PRB\_RA} = \begin{cases} I_{PRB\_RA}^{lowest\_index}, & \text{When the uplink shared resource is the first } TB \text{ transmitted on the } PUSCH \\ I_{PRB\_RA}^{lowest\_index} + 1, & \text{When the uplink shared resource is the second } TB \text{ transmitted on the } PUSCH \end{cases}, \text{ where}$$

$I_{PRB\_RA}^{lowest\_index}$ is used to identify a lowest PRB index corresponding to a first timeslot in the PUSCH transmission process.

Correspondingly, the UE obtains the agreed feedback location ($n_{PHICH}^{group}$, $n_{PHICH}^{seq}$) by means of calculation according to the resource location of the uplink shared resource and the DM-RS.

Step 1905: The eNB calculates an offset of the UE, where the offset of the UE is obtained according to the identifier of the UE.

Optionally, a preset arithmetic operation is performed on the identifier of the UE, and a result of the preset arithmetic operation is used as the offset corresponding to the UE.

In this embodiment, an offset corresponding to each UE is calculated in a modulo operation, and a specific calculation formula is as follows:

$$f(C\text{-RNTI}) = (C\text{-RNTI}) \% M,$$

where M is a positive integer.

The arithmetic operation is performed on the identifier of the UE, and the result of the arithmetic operation is used as the offset corresponding to the UE. Optionally, the arithmetic operation may be a modulo operation, a linear operation, a trigonometric function operation, or the like, provided that the arithmetic operation can meet a requirement for obtaining, by means of calculation, different offsets corresponding to identifiers of different UEs. Therefore, a type of the arithmetic operation is not limited in this embodiment.

Correspondingly, the UE obtains, by means of calculation according to the identifier of the UE, the offset corresponding to the UE, and the offset is obtained by the UE by performing a modulo operation on the identifier of the UE.

Step 1906: The eNB sends acknowledgement information ACK at a resource location of a downlink resource, where the resource location of the downlink resource is indicated by a combination of the agreed feedback location and the offset.

The downlink resource location may be a sum of the agreed feedback location and the offset.

That is:

$$n_{PHICH}^{group} = (I_{PRB\_RA} + n_{DMRS}) \bmod N_{PHICH}^{group} + I_{PHICH} N_{PHICH}^{group} + f(C\text{-RNTI}),$$

and $$n_{PHICH}^{seq} = (\lfloor I_{PRB\_RA}/N_{PHICH}^{group} \rfloor + n_{DMRS}) \bmod 2N_{SF}^{PHICH} + f(C\text{-RNTI}),$$

$n_{PHICH}^{group}$ is used to identify a group number of a group to which the downlink resource belongs on the PHICH; $n_{PHICH}^{seq}$ is used to identify the orthogonal sequence number of the downlink resource in the group on the PHICH; $n_{DMRS}$ is used to identify the DM-RS sequence that is last indicated by the PDCCH to the UE; $N_{PHICH}^{group}$ is used to identify the quantity of groups on the PHICH; $N_{SF}^{PHICH}$ is the spreading factor used for modulating the PHICH; and $f(C\text{-RNTI})$ is the offset corresponding to the UE, where $$I_{PHICH} = \begin{cases} 1 & \text{When an uplink-downlink configuration in a } TDD \text{ mode is 0 and the uplink data is sent in a subframe 4 or subframe 9 on a physical uplink shared channel } PUSCH \\ 0 & \text{Otherwise} \end{cases},$$

and $$I_{PRB\_RA} = \begin{cases} I_{PRB\_RA}^{lowest\_index}, & \text{When the uplink shared resource is the first } TB \text{ transmitted on the } PUSCH \\ I_{PRB\_RA}^{lowest\_index} + 1, & \text{When the uplink shared resource is the second } TB \text{ transmitted on the } PUSCH \end{cases}, \text{ where}$$

$I_{PRB\_RA}^{lowest\_index}$ is used to identify a lowest PRB index corresponding to a first timeslot in the PUSCH transmission process.

Optionally, the calculation formula of the offset is as follows:

$$f(C\text{-RNTI}) = (C\text{-RNTI}) \% M,$$

where M is a positive integer.

Step 1907: The UE receives the acknowledgement information ACK at the resource location of the downlink resource, where the resource location of the downlink resource is indicated by the combination of the agreed feedback location and the offset.

Step 1908: If the UE fails in receiving the acknowledgement information ACK sent by the eNB, it indicates that the eNB fails in receiving the uplink data, and the UE re-sends the uplink data.

In conclusion, the eNB allocates the same uplink shared resource and DM-RS to the m UEs; the UE sends the uplink data by using the uplink shared resource allocated by the eNB, where the uplink data includes the identifier and the DM-RS that are of the UE; the eNB receives the uplink data on the uplink shared resource by using the DM-RS; the eNB obtains the agreed feedback location by means of calculation according to the resource location of the uplink shared resource and the DM-RS, and obtains, by means of calculation according to the identifier of each UE, the offset corresponding to the UE; and the eNB sends the acknowledgement information ACK on the downlink resource indicated by the combination of the agreed feedback location and the offset. This resolves a prior-art problem that an eNB cannot correctly send feedback information to different UEs according to an agreed downlink resource when the multiple UEs send uplink data by using a same uplink shared resource and DM-RS, so that each UE is clear about whether the uplink data of the UE is successfully sent.

It should be noted that the steps related to an eNB side in the aspect of FIG. 19 may be independently implemented as a feedback information sending method from a perspective of the eNB side, and the steps related to a UE side may be independently implemented as a feedback information receiving method from a perspective of the UE side.

Step 1315 in FIG. 13A and FIG. 13B, step 1416 in FIG. 14A and FIG. 14B, step 1619 in FIG. 16A, FIG. 16B, and FIG. 16C, step 1819 in FIG. 18A, FIG. 18B, and FIG. 18C, and step 1908 in FIG. 19 are steps of re-sending uplink data by UE. To reduce a possibility of contention conflict reoccurrence during uplink data re-sending performed by UE, the foregoing steps related to re-sending uplink data may be replaced with the following step 2001 to step 2005.

Step 2001: An eNB pre-allocates respective corresponding second random numbers to m UEs.

The second random number is used by the UE when an identifier of the UE is not included in feedback information. The second random number is pre-allocated to the UE before the eNB sends the feedback information to the UE by using a MAC PDU.

Step 2002: The UE randomly generates a first random number when a first available uplink shared resource exists.

The first available uplink shared resource is a first uplink shared resource that appears after the UE finds that the identifier corresponding to the UE is not included in received feedback information. The first random number is randomly generated by the UE, and is used to determine whether the UE re-sends uplink data on the first available uplink shared resource.

Step 2003: The UE reads a second random number in a buffer, where the second random number is pre-allocated by the eNB.

It is determined, by comparing values of the first random number and the second random number, whether the UE re-sends the uplink data on the first available uplink shared resource.

Step 2004: Determine whether a value relationship between the first random number and the second random number meets a preset condition.

Step 2005: If the value relationship between the first random number and the second random number meets the preset condition, re-send uplink data of the UE on the first available uplink shared resource.

Step 2006: If the value relationship between the first random number and the second random number does not meet the preset condition, re-perform the step of randomly generating a first random number when a first available uplink shared resource exists.

If the value relationship between the first random number and the second random number does not meet the preset condition, step 2002 is re-performed.

Optionally, the preset condition may be that the first random number is greater than the second random number or the first random number is less than the second random number. The preset condition is not limited in this embodiment.

If a quantity of times of re-sending the uplink data by the UE on an uplink shared resource exceeds N, the UE no longer sends the uplink data by using an uplink shared resource, and optionally transmits the uplink data by using a scheduling-based method.

In conclusion, in this embodiment, the eNB allocates the respective corresponding second random numbers to the UEs; the UE randomly generates the first random number when the first available uplink shared resource exists; and it is determined, by comparing the values of the first random number and the second random number, whether the UE re-sends the uplink data on the first available uplink shared resource, so as to reduce a possibility of contention conflict reoccurrence during uplink data re-sending performed on the first available uplink shared resource by multiple UEs.

Figure 20:
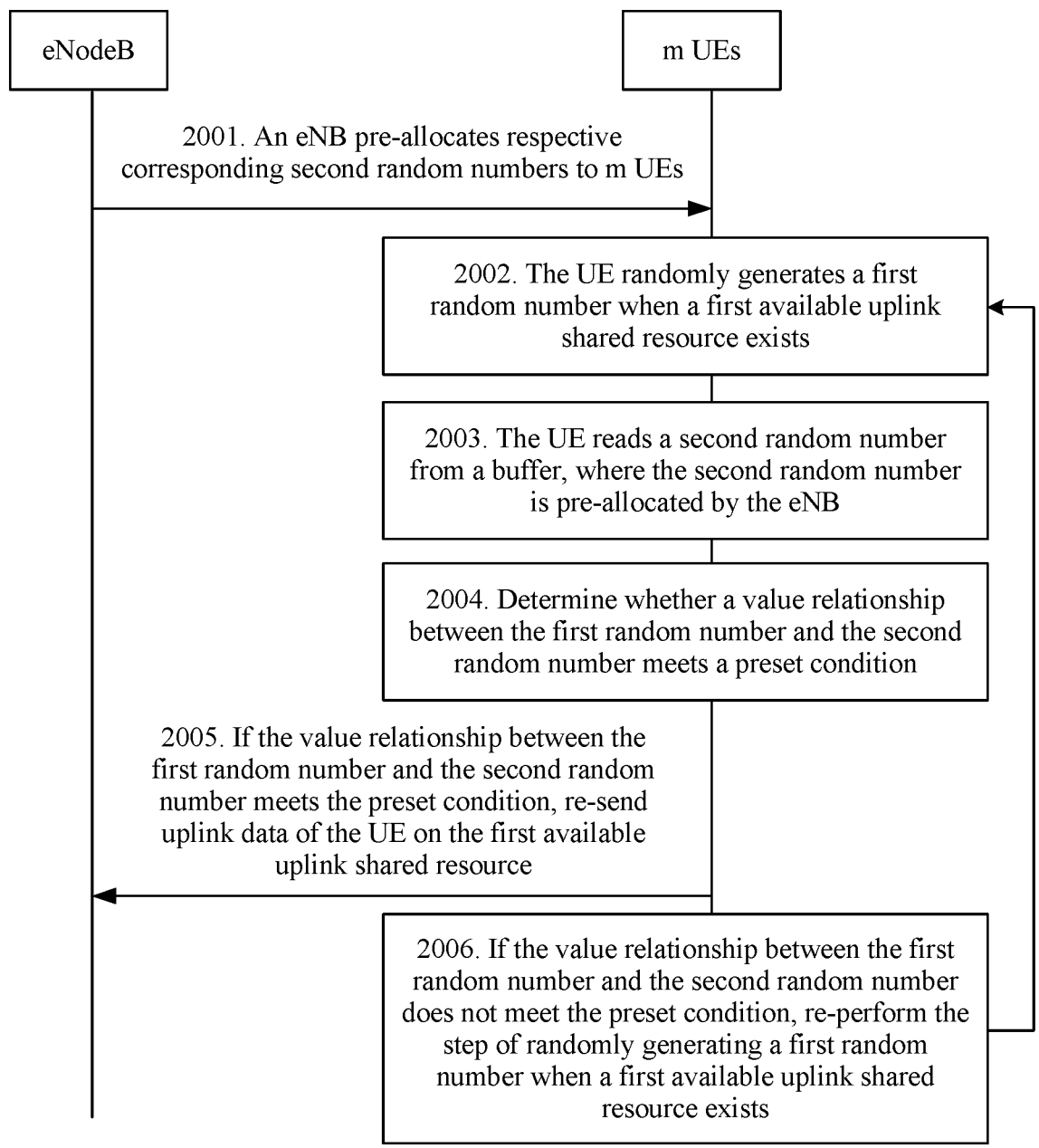
FIG. 20 is a flowchart of an uplink data re-sending method according to an aspect of the present disclosure.
Figure 21:
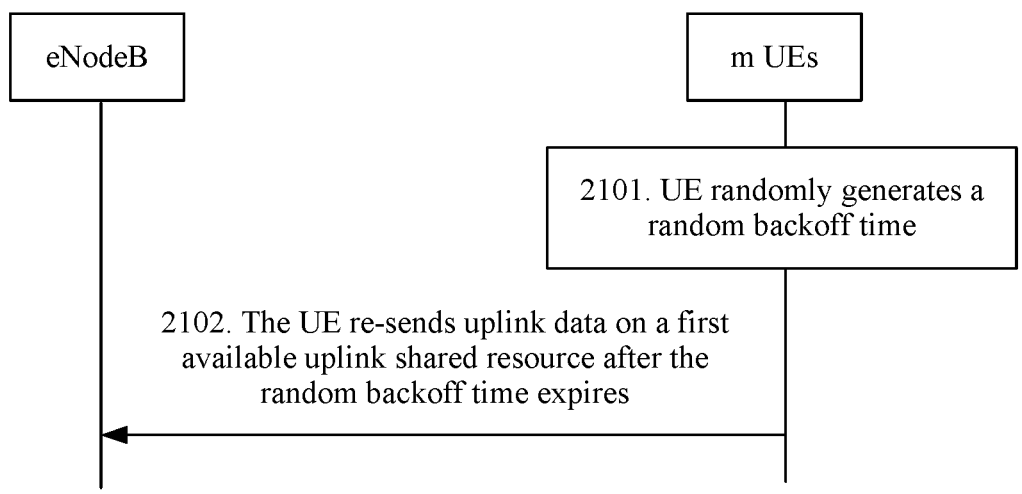
FIG. 21 is a flowchart of an uplink data re-sending method according to another aspect of the present disclosure.

In an implementation different from the aspect of FIG. 20, step 1315 in the aspect of FIG. 13A and FIG. 13B, step 1416 in the aspect of FIG. 14A and FIG. 14B, step 1619 in the aspect of FIG. 16A, FIG. 16B, and FIG. 16C, step 1819 in the aspect of FIG. 18A, FIG. 18B, and FIG. 18C, and step 1908 in the aspect of FIG. 19 may be replaced with the following step 2101 and step 2102 in FIG. 21. FIG. 21 is a flowchart of an uplink data re-sending method according to another aspect of the present disclosure.

Step 2101: UE randomly generates a random backoff time.

The random backoff time is randomly generated after the UE finds that an identifier corresponding to the UE is not included in received feedback information.

Step 2102: The UE re-sends uplink data on a first available uplink shared resource after the random backoff time expires.

The first available uplink shared resource is a first uplink shared resource that appears after expiry of the random backoff time randomly generated after the UE finds that the identifier corresponding to the UE is not included in the received feedback information.

If a quantity of times of re-sending the uplink data by the UE on an uplink shared resource exceeds N, the UE no longer sends the uplink data by using an uplink shared resource, and optionally transmits the uplink data by using a scheduling-based method.

In conclusion, in this embodiment, the UE randomly generates the random backoff time after finding that the identifier corresponding to the UE is not included in the received feedback information, and the UE re-sends the uplink data on the first available uplink shared resource after the random backoff time expires, so as to reduce a possibility of contention conflict reoccurrence during uplink data re-sending performed on the first available uplink shared resource by multiple UEs.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A base station, comprising a processor, a memory, and a transceiver, the memory is configured to store at least one instruction, when executed by the processor, configuring the processor to:
    allocate a same uplink shared resource to m user equipments (UEs), wherein m is an integer greater than 1;
    control the transceiver to receive uplink data on the uplink shared resource, wherein the uplink data comprises at least one UE identifier identifying at least one of the m UEs, wherein each UE identifier uniquely represents one UE;

determine n UEs, wherein uplink data of the n UEs is successfully received, wherein n is a positive integer and m is greater than or equal to n;

generate feedback information, wherein the feedback information comprises n identifiers, and different identifiers represent different UEs; and control the transceiver to send the feedback information by using a Media Access Control protocol data unit (MAC PDU), wherein:

the processor is further configured to generate the MAC PDU corresponding to the UE, wherein the MAC PDU comprises the feedback information;

the processor is configured to scramble control channel indication information by using a designated identifier, wherein the designated identifier is an identifier corresponding to the m UEs, and the control channel indication information is used to indicate a resource location of a downlink resource that carries the MAC PDU;

the processor is configured to control the transceiver to send the control channel indication information to the UE; and the processor is configured to control the transceiver to send the MAC PDU by using the downlink resource indicated by the control channel indication information.

2. The base station according to claim 1, wherein the processor is configured to generate the feedback information, wherein the feedback information comprises a quantity of significant bits, a bit mapping sequence, the n identifiers, and x uplink scheduling grants;

the quantity of significant bits is used to indicate a quantity of significant bits in the bit mapping sequence;

the bit mapping sequence is a bit sequence with a fixed bit quantity; and when the ith bit in the bit mapping sequence is a first value and is significant, it indicates that the ith UE identifier in the feedback information is followed by a corresponding uplink scheduling grant with a fixed bit quantity; or when the ith bit in the bit mapping sequence is a second value and is significant, it indicates that the ith UE identifier in the feedback information is not followed by the corresponding uplink scheduling grant with a fixed bit quantity, wherein the first value is 0 and the second value is 1, or the first value is 1 and the second value is 0.

3. The base station according to claim 1, wherein the designated identifier is a contention based radio network temporary identifier (CB-RNTI).

4. The base station according to claim 1, wherein the designated identifier is a transmission time interval radio network identifier (TTI-RNTI), wherein the TTI-RNTI is generated according to a resource location of the uplink shared resource.

5. The base station according to claim 1, wherein the processor is further configured to allocate respective corresponding second random numbers to the m UEs; and wherein the second random number is a random number used for determining, when the feedback information does not comprise the identifier of the UE, whether the uplink data is re-sent on a first available uplink shared resource.

6. A communication device, comprising: a processor, a memory, and a transceiver, wherein the memory is configured to store at least one instruction, when executed by the processor, causing the processor to:

determine an uplink shared resource of the communication device;

control the transceiver to send uplink data by using the uplink shared resource, wherein the uplink data comprises an identifier of the device; and control the transceiver to receive feedback information by using a Media Access Control protocol data unit (MAC PDU), wherein the feedback information comprises n identifiers, different identifiers in the n identifiers represent different devices, the identifiers indicate that uplink data of the n devices is successfully received by a base station, and n is a positive integer, wherein:

the processor is further configured to read a quantity of significant bits and a bit mapping sequence from the feedback information, wherein the quantity of significant bits is used to indicate a quantity of significant bits in the bit mapping sequence, and the bit mapping sequence is a bit sequence with a fixed bit quantity;

the processor is further configured to: when the ith bit in the bit mapping sequence is a first value and is significant, read the ith identifier and a corresponding uplink scheduling grant from the feedback information;

the processor is further configured to detect whether the ith identifier is the identifier of the device;

the processor is further configured to: when the ith identifier is the identifier of the device, control the transceiver to send the remaining to-be-sent data according to the uplink scheduling grant;

the processor is further configured to: when the ith bit in the bit mapping sequence is a second value and is significant, read the ith identifier from the feedback information; and the processor is further configured to detect whether the ith identifier is the identifier of the device, wherein if the ith identifier of device is the identifier of the device, it indicates that the base station successfully receives the uplink data of the device.

7. The communication device according to claim 6, wherein the processor is configured to: when the identifier of the device is not in the identifiers comprised in the feedback information, that is, when the base station fails in receiving the uplink data of the device, control the transceiver to re-send the uplink data.

8. The communication device according to claim 7, wherein the processor is configured to randomly generate a first random number when a first available uplink shared resource exists;

the processor is configured to read a second random number from a buffer, wherein the second random number is pre-allocated by the base station;

the processor is configured to determine whether a value relationship between the first random number and the second random number meets a preset condition;

the processor is configured to: when the value relationship between the first random number and the second random number meets the preset condition, control the transceiver to re-send the uplink data on the first available uplink shared resource; and the processor is configured to: when the value relationship between the first random number and the second random number does not meet the preset condition, re-perform the step of randomly generating a first random number when a first available uplink shared resource exists.

9. The communication device according to claim 7, wherein
the processor is configured to randomly generate a random backoff time; and
the processor is configured to control the transceiver to re-send the uplink data on a first available uplink shared resource after the random backoff time expires.

10. A feedback information sending method, wherein the method comprises:
allocating a same uplink shared resource to m user equipments (UEs), wherein m is a positive integer greater than 1;
receiving uplink data on the uplink shared resource, wherein the uplink data comprises a UE identifier, identifiers of different UEs represent the different UEs, and the UE represented by the identifier of the UE is at least one of the m UEs;
determining n UEs, wherein uplink data of the n UEs is successfully received, wherein n is a positive integer and m is greater than or equal to n;
generating feedback information, wherein the feedback information comprises n identifiers, and different identifiers represent different UEs; and
sending the feedback information by using a Media Access Control protocol data unit (MAC PDU),
wherein the sending the feedback information by using a MAC PDU comprises:
generating the MAC PDU corresponding to the UE, wherein the MAC PDU comprises the feedback information;
scrambling control channel indication information by using a designated identifier, wherein the designated identifier is an identifier corresponding to the m UEs, and the control channel indication information is used to indicate a resource location of a downlink resource that carries the MAC PDU;
sending the control channel indication information to the UE; and
sending the MAC PDU by using the downlink resource indicated by the control channel indication information.

11. The method according to claim 10, wherein the uplink data further comprises buffer status information of the UEs, and the buffer status information of the UEs is used to indicate information about remaining to-be-sent data of the UEs; and
the generating feedback information comprises:
obtaining the identifiers of the UEs and the buffer status information of the UEs by means of decoding;
generating uplink scheduling grants of the UEs, wherein the uplink scheduling grants of the UEs are generated according to the buffer status information of the UEs; and
generating the feedback information, wherein the feedback information comprises the n identifiers and the uplink scheduling grants corresponding to the UEs.

12. The method according to claim 10, wherein x pieces of the uplink data comprise buffer status information of the UE, n≥x≥1, and the buffer status information of the UE is used to indicate information about remaining to-be-sent data; and
wherein generating feedback information comprises:
obtaining, by means of decoding, the identifiers of the n UEs and buffer status information corresponding to x UEs;
generating uplink scheduling grants respectively corresponding to the x UEs, wherein the x uplink scheduling grants are generated according to the buffer status information of the x UEs; and
generating the feedback information, wherein the feedback information comprises the n identifiers and the uplink scheduling grants corresponding to the x UEs.

13. The method according to claim 12, wherein generating feedback information comprises:
generating the feedback information, wherein the feedback information comprises a quantity of significant bits, a bit mapping sequence, the n identifiers, and the x uplink scheduling grants, wherein
the quantity of significant bits is used to indicate a quantity of significant bits in the bit mapping sequence;
the bit mapping sequence is a bit sequence with a fixed bit quantity; and
when the ith bit in the bit mapping sequence is a first value and is significant, it indicates that the ith UE identifier in the feedback information is followed by a corresponding uplink scheduling grant with a fixed bit quantity; or when the ith bit in the bit mapping sequence is a second value and is significant, it indicates that the UE identifier in the feedback information is not followed by the corresponding uplink scheduling grant with a fixed bit quantity, wherein
the first value is 0 and the second value is 1, or the first value is 1 and the second value is 0.

14. The method according to claim 10, wherein the designated identifier is a contention based radio network temporary identifier (CB-RNTI).

15. The method according to claim 10, wherein the designated identifier is a transmission time interval radio network identifier (TTI-RNTI), wherein the TTI-RNTI is generated according to a resource location of the uplink shared resource.

16. The method according to claim 10, before sending the feedback information by using a MAC PDU, further comprising:
allocating respective corresponding second random numbers to the m UEs, wherein the second random number is a random number used for determining, by the UE when the feedback information does not comprise the identifier of the UE, whether the uplink data is re-sent on a first available uplink shared resource.

* * * * *